US012793950B2

(12) United States Patent
Nardini et al.

(10) Patent No.: US 12,793,950 B2
(45) Date of Patent: Nov. 10, 2026

(54) NANOPARTICLE DETECTION THRESHOLD DETERMINATION THROUGH LOCAL MINIMUM ANALYSIS

(71) Applicant: Elemental Scientific, Inc., Omaha, NE (US)

(72) Inventors: Cole J. Nardini, Omaha, NE (US); Austin Schultz, Omaha, NE (US); Daniel R. Wiederin, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 537 days.

(21) Appl. No.: 18/137,555

(22) Filed: Apr. 21, 2023

(65) Prior Publication Data

US 2023/0352289 A1 Nov. 2, 2023

Related U.S. Application Data

(60) Provisional application No. 63/335,510, filed on Apr. 27, 2022, provisional application No. 63/335,516, (Continued)

(51) Int. Cl.
*H01J 49/00* (2006.01)
*H01J 49/04* (2006.01)
(Continued)

(52) U.S. Cl.
CPC ...... *H01J 49/0031* (2013.01); *H01J 49/0036* (2013.01); *H01J 49/045* (2013.01); *H01J 49/105* (2013.01); *H01J 49/36* (2013.01)

(58) Field of Classification Search
CPC .. H01J 49/0031; H01J 49/0036; H01J 49/045; H01J 49/105; H01J 49/36
See application file for complete search history.

(56) References Cited

U.S. PATENT DOCUMENTS 7,488,935 B2 2/2009 Altmayer
8,626,449 B2 1/2014 Prather et al.
(Continued)

FOREIGN PATENT DOCUMENTS

CN 217158107 U 8/2022
JP 2018141811 A 9/2018
(Continued)

OTHER PUBLICATIONS

Mitrano, D., "Detecting Nanoparticulate Silver Using Single-Particle Inductively Coupled Plasma-Mass Spectrometry," Nanomaterials in the Environment, Environmental Toxicology and Chemistry, 2012, vol. 31, No. 1, pp. 115-121. (Accepted Apr. 17, 2011).
(Continued)

*Primary Examiner* — Wyatt A Stoffa
(74) *Attorney, Agent, or Firm* — Kevin E. West; Advent, LLP

(57) ABSTRACT

Systems and methods are described for analyzing local minimum data from spectrometry data for the determination of nanoparticle detection thresholds are described. In aspects, a histogram of the spectrometry data is used to search for potential local minimum values, which are subsequently validated to establish a nanoparticle detection threshold for the spectrometry data, with ion intensity values less than the nanoparticle detection threshold being attributable to signal background.

16 Claims, 19 Drawing Sheets

| Count | 1 | 2 | 3 | 4 | 5 | 6 | 7 | 8 | 9 | 10 |
|---|---|---|---|---|---|---|---|---|---|---|
| Freq | 51 | 26 | 12 | 5 | 2 | 0 | 0 | 2 | 5 | 1 |

Related U.S. Application Data filed on Apr. 27, 2022, provisional application No. 63/335,523, filed on Apr. 27, 2022.

(51) Int. Cl.

| | |
|---|---|
| ***H01J 49/10*** | (2006.01) |
| ***H01J 49/36*** | (2006.01) |

(56) References Cited

U.S. PATENT DOCUMENTS

| | | | | |
|---|---|---|---|---|
| 9,343,283 | B1 | 5/2016 | Field et al. | |
| 9,754,774 | B2 | 9/2017 | Bazargan et al. | |
| 9,865,443 | B2 | 1/2018 | Taniguchi | |
| 10,854,438 | B2 | 12/2020 | Yamada et al. | |
| 11,075,066 | B2 * | 7/2021 | Itagaki | H01J 49/105 |
| 11,232,934 | B2 | 1/2022 | Moulds | |
| 11,443,933 | B1 | 9/2022 | Yamada | |
| 11,569,081 | B2 | 1/2023 | Kawabata et al. | |
| 12,085,497 | B1 * | 9/2024 | Kim | G01N 15/1429 |
| 2011/0049353 | A1 | 3/2011 | Gilbert et al. | |
| 2015/0235833 | A1 * | 8/2015 | Bazargan | H01J 49/0036 702/189 |
| 2019/0341240 | A1 | 11/2019 | Wang | |
| 2020/0103077 | A1 | 4/2020 | Wiederin et al. | |
| 2020/0135443 | A1 | 4/2020 | Itagaki et al. | |
| 2020/0266042 | A1 | 8/2020 | Geromanos et al. | |
| 2021/0131918 | A1 | 5/2021 | Wiederin et al. | |
| 2021/0181165 | A1 | 6/2021 | Lang et al. | |

FOREIGN PATENT DOCUMENTS

| | | | |
|---|---|---|---|
| JP | 2019100891 | A | 6/2019 |
| JP | 6642125 | B2 | 2/2020 |
| JP | 6695088 | B1 | 5/2020 |
| KR | 101711081 | B1 | 2/2017 |
| WO | 2015122920 | A1 | 8/2015 |

OTHER PUBLICATIONS

PCT International Search Report and Written Opinion for PCT/US2023/019427, dated Aug. 21, 2023.

PCT International Search Report for PCT/US2023/019441, dated Aug. 7, 2023.

Hendriks, L. et al., "Performance of sp-ICP-TOFMS with signal distributions fitted to a compound Poisson model," Journal of Analytical Atomic Spectrometry, Jul. 25, 2019, pp. 1900-1909, vol. 34, issue 9.

Aborda, F. et al., "About detectability and limits of detection in single particle inductively coupled plasma mass spectrometry," Spectrochimica Acta Part B, Jul. 2020, pp. 1-11, vol. 169, Article No. 105883.

PCT International Search Report and Written Opinion for PCT/US2023/019435, dated Aug. 7, 2023.

Notice of Preliminary Rejection for Korean Application No. 1020247039050, dated Jul. 16, 2026.

* cited by examiner

NANOPARTICLE DETECTION THRESHOLD DETERMINATION THROUGH LOCAL MINIMUM ANALYSIS

CROSS-REFERENCE TO RELATED APPLICATIONS

The present application claims the benefit of 35 U.S.C. § 119(e) of U.S. Provisional Application Ser. No. 63/335,510, filed Apr. 27, 2022, and titled "NANOPARTICLE BASELINE AND PARTICLE DETECTION THRESHOLD DETERMINATION THROUGH ITERATIVE OUTLIER REMOVAL," of U.S. Provisional Application Ser. No. 63/335,516, filed Apr. 27, 2022, and titled "NANOPARTICLE DETECTION THRESHOLD DETERMINATION THROUGH LOCAL MINIMUM ANALYSIS," and of U.S. Provisional Application Ser. No. 63/335,523, filed Apr. 27, 2022, and titled "MULTI DATA PROCESS SWITCHING FOR NANOPARTICLE BASELINE AND DETECTION THRESHOLD DETERMINATION." U.S. Provisional Applications Ser. Nos. 63/335,510, 63/335,516, and 63/335,523 are herein incorporated by reference in their entireties.

BACKGROUND

Inductively coupled plasma (ICP) mass spectroscopy is an analysis technique commonly used for the determination of trace element concentrations and isotope ratios in liquid samples. ICP mass spectroscopy employs electromagnetically generated partially ionized argon plasma which reaches a temperature of approximately 7000K. When a sample is introduced to the plasma, the high temperature causes sample atoms to become ionized or emit light. Since each chemical element produces a characteristic mass or emission spectrum, measuring said spectra allows the determination of the elemental composition of the original sample.

Sample introduction systems may be employed to introduce the liquid samples into the ICP mass spectroscopy instrumentation (e.g., an inductively coupled plasma mass spectrometer (ICP/ICPMS), an inductively coupled plasma atomic emission spectrometer (ICP-AES), or the like) for analysis. For example, a sample introduction system may withdraw an aliquot of a liquid sample from a container and thereafter transport the aliquot to a nebulizer that converts the aliquot into a polydisperse aerosol suitable for ionization in plasma by the ICP mass spectrometry instrumentation. The aerosol is then sorted in a spray chamber to remove the larger aerosol particles. Upon leaving the spray chamber, the aerosol is introduced to the ICPMS or ICPAES instruments for analysis. Often, the sample introduction is automated to allow a large number of samples to be introduced into the ICP mass spectroscopy instrumentation in an efficient manner.

SUMMARY

Systems and methods for analyzing spectrometry data for the determination of nanoparticle factors including one or more of nanoparticle baselines and nanoparticle detection thresholds are described. In an aspect, a method embodiment includes, but is not limited to, transferring a fluid sample containing nanoparticles to a spectrometry sample analyzer; generating a spectrometry data set via the spectrometry sample analyzer associated with detected ion signal intensity over time; generating from the spectrometry data set, via one or more computer processors, a raw data set that includes a count distribution of counts of ion signal intensity and a frequency of the ion signal intensity of each count; iteratively removing, via the one or more computer processors, ion signal intensity values that exceed an outlier threshold value associated with a sum of a first multiple of an average of the count distribution of ion signal intensity and a first multiple of a standard deviation of the count distribution of ion signal intensity until no count values exceed the outlier threshold value to provide a background data set; and setting, via the one or more computer processors, a nanoparticle baseline intensity value as a sum of a second multiple of an average of the background data set and a second multiple of a standard deviation of the background data set, wherein the first multiple of the standard deviation of the count distribution of ion signal intensity differs from the second multiple of a standard deviation of the background data set.

In an aspect, a method embodiment includes, but is not limited to, transferring a fluid sample containing nanoparticles to a spectrometry sample analyzer; generating a spectrometry data set via the spectrometry sample analyzer associated with detected ion signal intensity over time; forming, via one or more computer processors, a histogram of the spectrometry data set, the histogram associated with a frequency of counts of integrated ion signal intensity values; incrementing along the histogram, via the one or more computer processors, a window spanning multiple counts of the histogram to determine a potential local minimum frequency value within the window; validating, via the one or more computer processors, whether the potential local minimum frequency value is a local minimum for the histogram to provide a validated local minimum; and assigning, via the one or more computer processors, the validated local minimum as a detection threshold for nanoparticles in the spectrometry data set.

In an aspect, a method embodiment includes, but is not limited to, transferring a fluid sample containing nanoparticles to a spectrometry sample analyzer; generating a spectrometry data set via the spectrometry sample analyzer associated with detected ion signal intensity over time; analyzing the spectrometry data set with a first data process, via one or more computer processors, to determine at least one of a first nanoparticle baseline or a first nanoparticle detection threshold with the first data process; automatically switching to a second data process to analyze, via the one or more computer processors, the spectrometry data set to determine at least one of a second nanoparticle baseline or a second nanoparticle detection threshold with the second data process; and determining, via the one or more computer processors, whether results from the first data process converge or diverge from results from the second data process.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

DETAILED DESCRIPTION

Overview

Figure 1A:
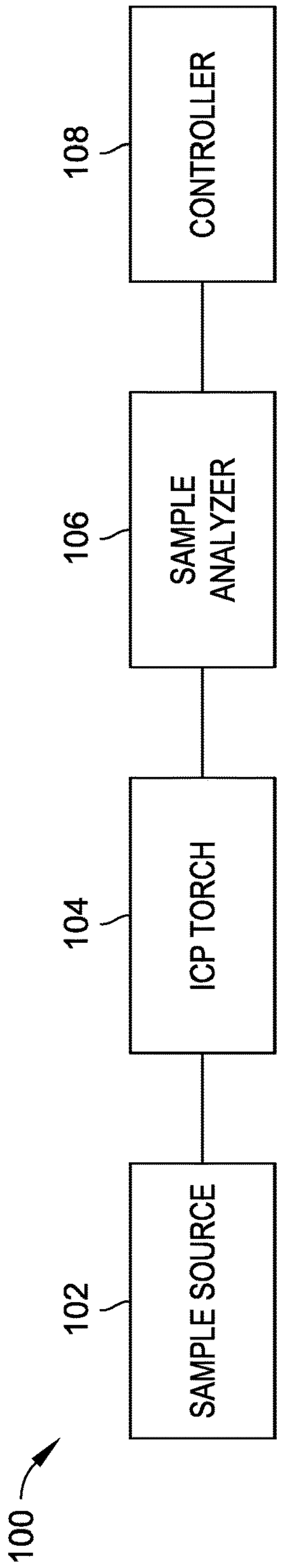
FIG. 1A is a schematic illustration of a system for analysis of nanoparticles in accordance with example implementations of the present disclosure.

Nanoparticle research has grown to encompass applications from the medical industry to the environmental industry. Such applications can focus on capabilities to detect nanoparticles (e.g., particles of less than 1000 nm in diameter) and to calculate the sizes of nanoparticles present in a sample. However, determining what is a nanoparticle and what is not a nanoparticle when analyzing spectrometry data poses many challenges. For instance, spectrometry data, such as ICPMS data, includes information associated with ionized samples and background interference, such as resulting from plasma gases introduced to the ICP torch, that can overlap with data associated with small nanoparticles. For example, as the size of the nanoparticle decreases, the spectrometry data of the nanoparticle begins to converge with data associated with ionic species produced by the ICP torch. This overlap and the associated challenges with removing background interferences, while avoiding nanoparticle data removal, lead to continued problems in providing reliable data associated with nanoparticles, including, but not limited to, identification of nanoparticles and determining the number of nanoparticles and their associated size distributions.

Accordingly, in one aspect, the present disclosure is directed to systems and methods for analyzing local minimum data from spectrometry data for the determination of nanoparticle detection thresholds. A histogram of the spectrometry data is used to search for potential local minimum values, which are subsequently validated to establish a nanoparticle detection threshold for the spectrometry data, with ion intensity values less than the nanoparticle detection threshold being attributable to signal background (e.g., attributable to background interference, such as resulting from ionized plasma gases from the ICP torch) and with values greater than the nanoparticle detection threshold being attributable to the presence of nanoparticles in the sample. In aspects, the histogram is formed by subtracting from the spectrometry data set a background intensity value and integrating time-consecutive non-zero data points for detected intensity following subtraction of the background intensity value.

EXAMPLE IMPLEMENTATIONS

Referring generally to FIGS. 1A through 19, a process is shown for utilizing multiple data processes for the determination of nanoparticle baseline and nanoparticle detection thresholds in accordance with example implementations of the present disclosure. The process can switch between multiple data processes to analyze one or more properties of a spectrometry dataset and compare the results of the multiple data processes to determine a probability that one or more of the multiple data processes is providing reliable results for the determination of nanoparticle baseline and nanoparticle detection thresholds. The instant disclosure provides description of an example system for analysis of nanoparticles in FIGS. 1A and 1B, of example data processes in FIGS. 2 through 14, with an iterative determination data process described with respect to FIGS. 2 through 9B and a local minimum data process described with respect to FIGS. 10 through 15, and a description of example switching between multiple data processes with respect to FIGS. 16 through 19.

Figure 1B:
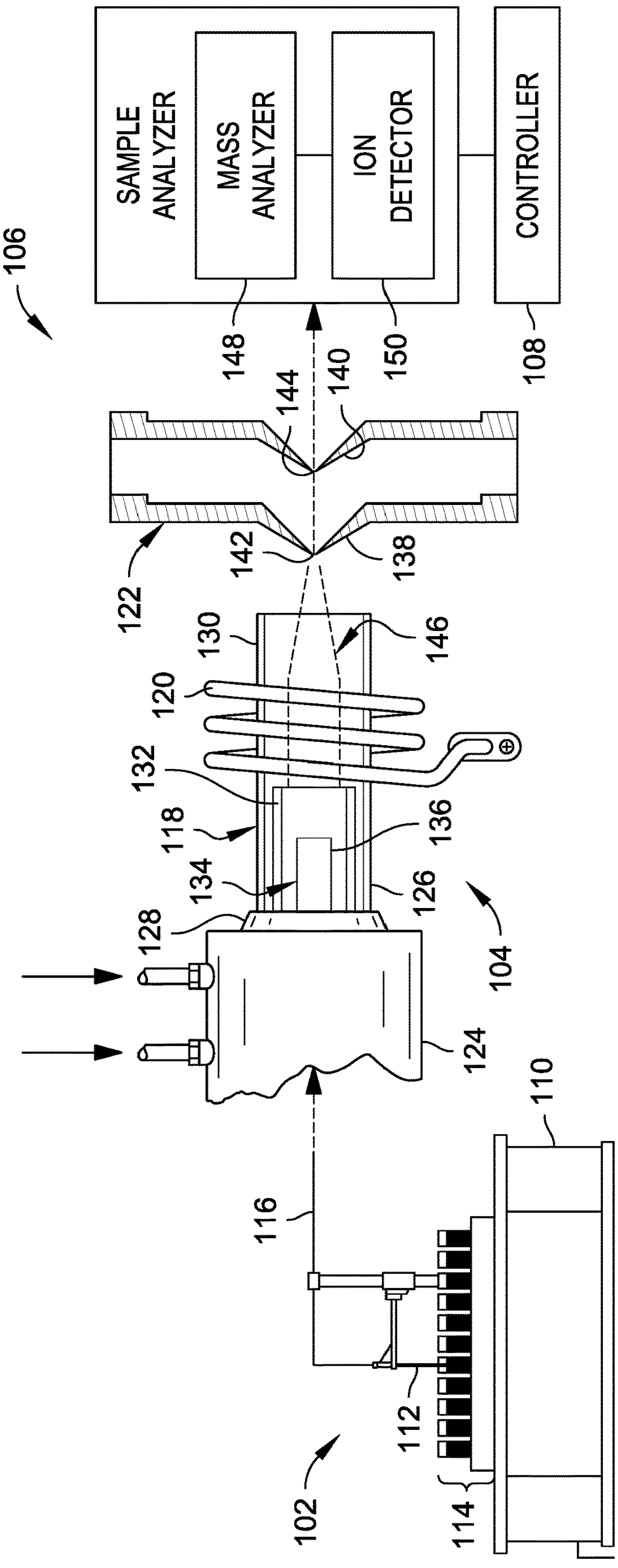
FIG. 1B is a partial diagrammatic illustration of the system of FIG. 1A in accordance with example implementations of the present disclosure.

Referring to FIGS. 1A and 1B, a system 100 for analysis of nanoparticles contained in fluid samples is shown in accordance with example implementations of the present disclosure. The system 100 generally includes a sample source 102, an inductively coupled plasma (ICP) torch 104, a sample analyzer 106, and a controller 108. The sample source 102 supplies a fluid sample containing nanoparticles for analysis by the sample analyzer 106 and can include, for example, an autosampler (e.g., autosampler 110 shown in FIG. 1B) to automate fluid handling of the sample. For instance, the autosampler 110 manipulates a sample probe 112 to draw fluid samples held in fluid containers 114 (e.g., sample vials, sample bottles, etc.) and transfer the fluid samples from the autosampler to other portions of the system, such as through vacuum transfer, pump transfer, or the like. The samples can include fluids containing nanoparticles of interest, diluents, sample matrix components, components for generation of calibration curves (e.g., standard fluids, standard nanoparticles, etc.), or the like, or combinations thereof. In implementations, the controller 108 facilitates control of one or more aspects of the fluid transfer from the autosampler 110. In implementations, the controller 108 includes a computer processor communicatively coupled with a computer memory to access control programming associated with one or more processes described herein for execution by the computer processor.

The sample source 102 is fluidically coupled with the ICP torch 104 (e.g., via a fluid transfer line 116) to transfer the fluid sample containing nanoparticles to the ICP torch 104 for ionization of the sample for analysis by the sample analyzer 106. In implementations, the sample source 102 includes one or more sample conditioning systems to prepare the fluid sample for introduction to the ICP torch 104. For example, the sample source 102 can include a nebulizer to receive the fluid sample from the autosampler 110 and aerosolize the fluid sample and a spray chamber to receive the aerosolized sample from the nebulizer and remove larger aerosol components through impact against spray chamber walls. The sample source 102 can thus condition the fluid sample to promote substantially continuous operation of the ICP torch 104 for sample ionization, such as by aerosolizing the sample and removing larger aerosol components to prevent extinguishing of the plasma generated by the ICP torch 104.

An example ICP torch 104 is shown in FIG. 1B, where the system is shown including a plasma torch assembly 118, a radio frequency (RF) induction coil 120 that is coupled to an RF generator (not shown), and an interface 122. The plasma torch assembly 118 includes a housing 124 that receives a plasma torch 126 configured to sustain the plasma. The plasma torch 126 is shown including a torch body 128, a first (outer) tube 130, a second (intermediate) tube 132, and an injector assembly 134 which includes a third (injector) tube 136. The plasma torch 126 is mounted by the housing 124 for positioning centrally in the RF induction coil 120 so that the end of the first (outer) tube 130 is adjacent to (e.g., approximately 10-20 mm from) the interface 122. The interface 122, which can be included in the sample analyzer 106 or as a separate component thereof, generally includes a sampler cone 138 positioned adjacent to the plasma and a skimmer cone 140 positioned adjacent to the sampler cone 138, opposite the plasma. A small diameter opening 142, 144 is formed in each cone 138, 140 at the apex of the cone 138, 140 to allow the passage of ions from the inductively coupled plasma for analysis by the sample analyzer 106.

A flow of gas (e.g., the plasma-forming gas), which is used to form the plasma (e.g., plasma 146), is passed between the first (outer) tube 130 and the second (intermediate) tube 132. A second flow of gas (e.g., the auxiliary gas) is passed between the second (intermediate) tube 132 and the third (injector) tube 136 of the injector assembly 134. The second flow of gas can be used to change the position of the base of the plasma relative to the ends of the second (intermediate) tube 132 and the third (injector) tube 136. In implementations, the plasma-forming gas and the auxiliary gas include argon (Ar), however other gases may be used instead of or in addition to argon (Ar), in specific implementations. The RF induction coil 120 surrounds the first (outer) tube 1130 of the plasma torch 126. RF power (e.g., 750-1500 W) is applied to the coil 120 to generate an alternating current within the coil 120. Oscillation of this alternating current (e.g., 27 MHz, 40 MHz, etc.) causes an electromagnetic field to be created in the plasma-forming gas within the first (outer) tube 130 of the plasma torch 126 to form an ICP discharge through inductive coupling. A carrier gas is then introduced into the third (injector) tube 136 of the injector assembly 134. The carrier gas passes through the center of the plasma, where it forms a channel that is cooler than the surrounding plasma. Samples to be analyzed are introduced into the carrier gas for transport into the plasma region, where the samples can be formed into an aerosol of liquid by passing the liquid sample from the sample source 102 into a nebulizer. As a droplet of nebulized sample enters the central channel of the ICP, it evaporates and any solids that were dissolved or carried in the liquid vaporize and then break down into atoms. In implementations, the carrier gas includes argon (Ar), however, other gases may be used instead of, or in addition to, argon (Ar) in specific implementations.

The sample analyzer 106 generally includes a mass analyzer 148 and an ion detector 150 to analyze the ions received from the ICP torch 104. For example, the sample analyzer 106 can direct ions received from the plasma of the ICP torch 104 and directed through the cones 138, 140 to the mass analyzer 148. The sample analyzer 106 can include various ion conditioning components, including, but not limited to, ion guides, vacuum chambers, reaction cells, and the like, suitable for operation of an ICPMS system. The mass analyzer 148 separates ions based on differing mass to charge ratios (m/z). For instance, the mass analyzer 148 can include a quadrupole mass analyzer, a time of flight mass analyzer, or the like. The ion detector 150 receives the separated ions from the mass analyzer 148 to detect and count ions according to the separated m/z ratios and output a detection signal. The controller 108 can receive the detection signal from the ion detector 150 to coordinate data for determination of the concentration of components in the ionized sample according to intensity of the signals of each ion detected by the ion detector 150 and for the determination of nanoparticle characteristics for nanoparticles contained in the fluid sample (e.g., nanoparticle size, nanoparticle amount, etc.).

Figure 2:
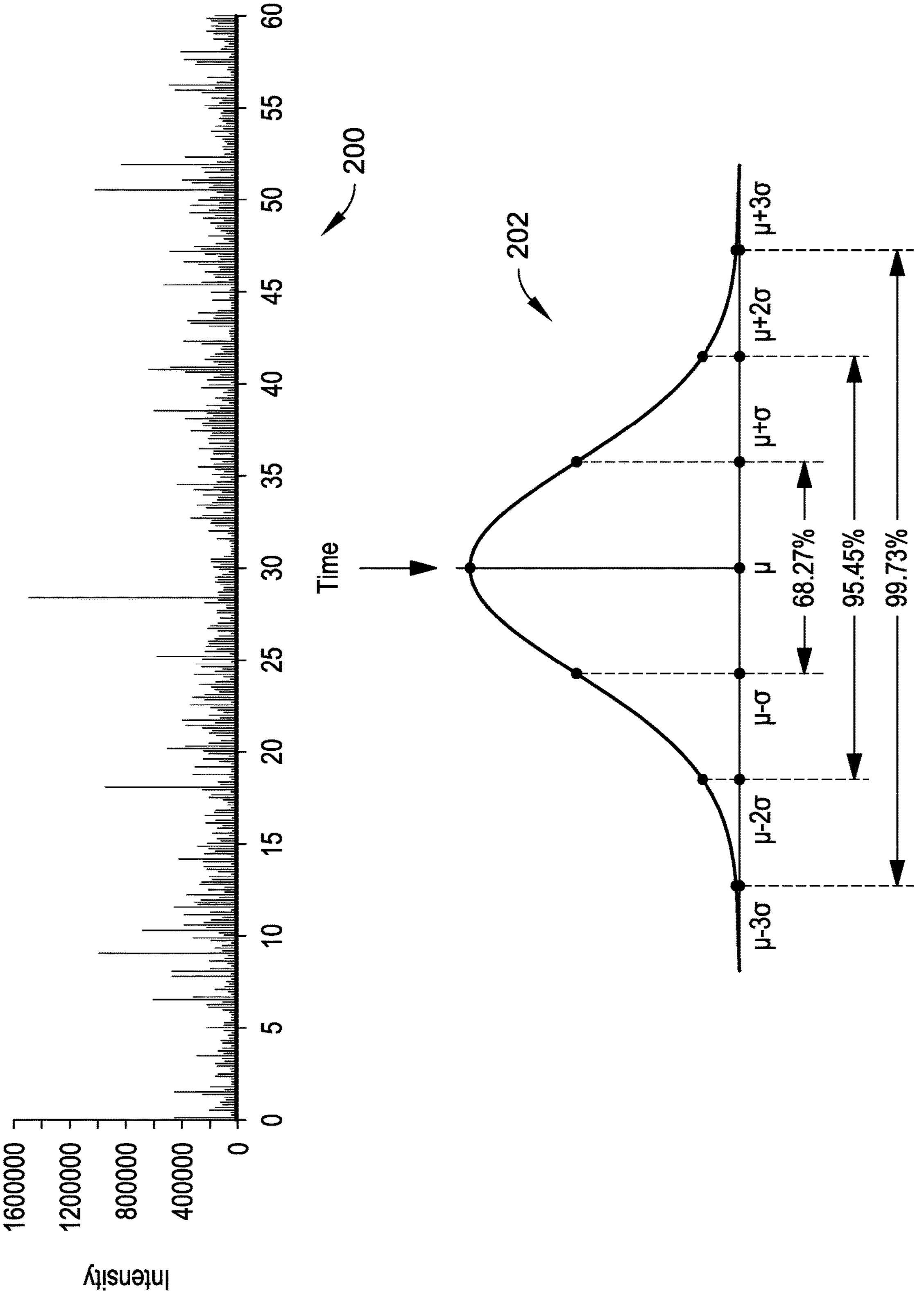
FIG. 2 is a schematic illustration of a spectrometry data set shown with a normal distribution curve in accordance with example implementations of the present disclosure.

An example spectroscopy data set from the controller 108 is shown in FIG. 2, where a spectrometry data set 200 is shown with a normal distribution curve 202. Ionic content present in a sample analyzed by ICPMS is generally homogenous. The processes described herein can proceed as though the ionic signals resemble a normal distribution centered around the average signal. For example, in the example spectrometry data set 200, ionic signals within one standard deviation from the average (i.e., $\mu\pm\sigma$) account for 68.27% of all the ionic signals, whereas ionic signals within two standard deviations from the average (i.e., $\mu\pm2\sigma$) account for 95.45% of all the ionic signals, and ionic signals within three standard deviations from the average (i.e., $\mu\pm3\sigma$) account for 99.73% of all the ionic signals. Outliers from the distribution are potentially nanoparticles present in the sample analyzed by the ICPMS. However, outliers can skew the standard deviation of the spectrometry dataset, so the processes described herein iteratively remove outliers from the dataset. For instance, example processes are described herein that iteratively remove outlier data from spectrometry data sets to determine particle baseline and a detection threshold for nanoparticles in accordance with example implementations of the present disclosure.

Figure 3:
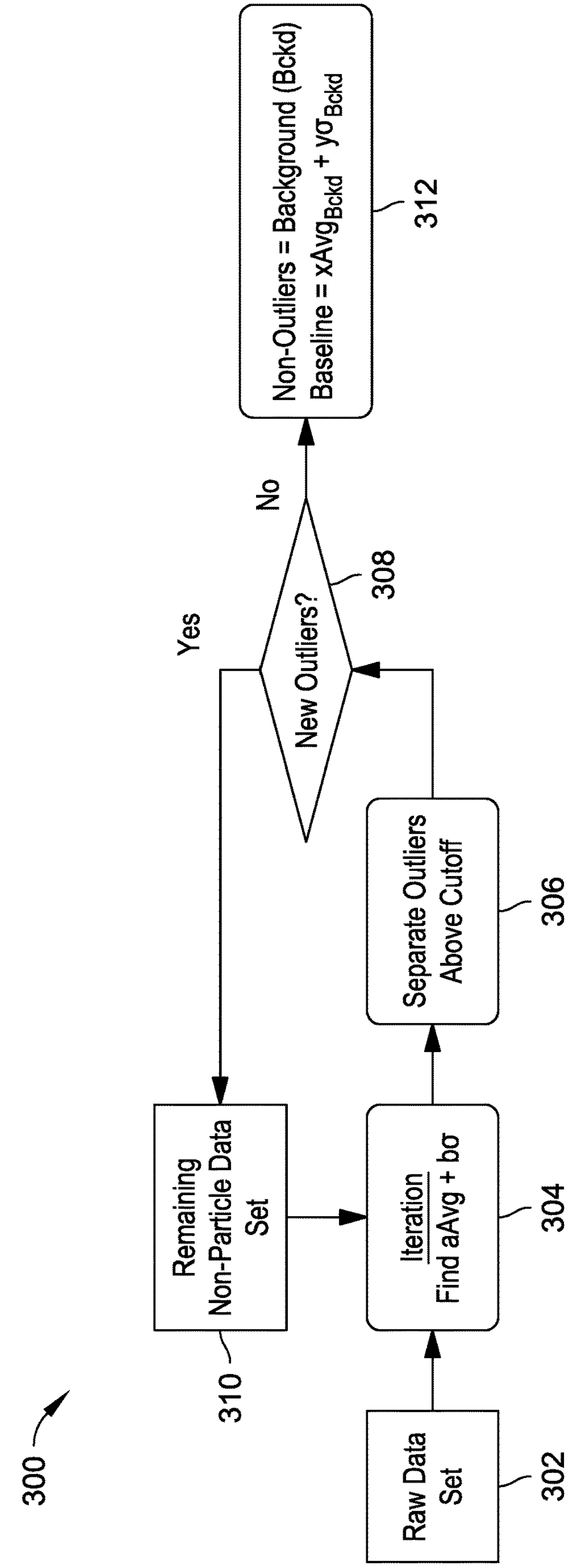
FIG. 3 is a flow diagram of a process for iterative determination of outlier data from a spectrometry data set to determine particle baseline and a detection threshold for nanoparticles in accordance with example implementations of the present disclosure.

Referring to FIG. 3, a flow diagram is shown of a process 300 for iterative determination of outlier data from a spectrometry data set to determine particle baseline and a detection threshold for nanoparticles in accordance with example implementations of the present disclosure. The flow diagram begins with a raw data set provided through spectrometry analysis of a sample (e.g., via ICPMS) in block 302. For example, for a spectrometry data set including ion signal intensity detected by the ion detector 108 as a function of time, the raw data set can include a count distribution of ion signal intensity and a frequency of the ion signal intensity. The raw data set is processed to determine a first iteration of an average and a standard deviation to determine outlier data points (e.g., those above a threshold) in block 304. In the example process shown, the outlier data points are identified as those exceeding a threshold of 1*avg+5*standarddeviation ($1\mu+5\sigma$). It is noted that the processes described herein are not limited to the multiples provided in the threshold calculation (i.e., 1*avg or 5*standarddeviation), where different multiples for the average and the standard deviation can be utilized. For example, in implementations, the multiples for the average and the standard deviation are a user-selectable feature. For instance, a user can select a specific multiple for the average and the standard deviation via interaction with a user interface communicatively coupled with the system 100.

The process 300 then removes any outliers from the data set based on the previous threshold calculation (i.e., $1\mu+5\sigma$) to approach a data set having no outliers (i.e., only ionic data without nanoparticle data) in block 306. The remaining data set (i.e., the raw data set without the outlier data) is then processed to determine a second iteration of an average and a standard deviation of the remaining data set to determine outlier data points (e.g., those above a threshold). For example, the process 300 proceeds to block 308 to determine whether any outliers remain based on a new threshold calculation with the remaining dataset after removal of the outlier datapoints from block 306. If outlier data points remain (i.e., "Yes" at block 308), the process 300 can acknowledge a data set having non-particle data still present in block 310 for further iterative removal of particle data. The process 300 continues to iterate the data set to remove the outlier data until no further outliers are identified. For example, the process 300 can proceed back to block 304 to treat the data from block 310 instead of the raw data set from block 302. When no further outliers are identified, the process establishes the resultant dataset as the data background and determines the nanoparticle baseline based on the data background in block 312. In implementations, the data background is determined using a baseline calculation having one or more different multiples than used for the iterative threshold calculations. For example, while the threshold is shown as $a\mu+b\sigma$, the baseline calculation is shown as $x\mu_{background}+y\sigma_{background}$, as described further herein. An example of the process 300 is described with respect to FIGS. 4-8

Figure 4:
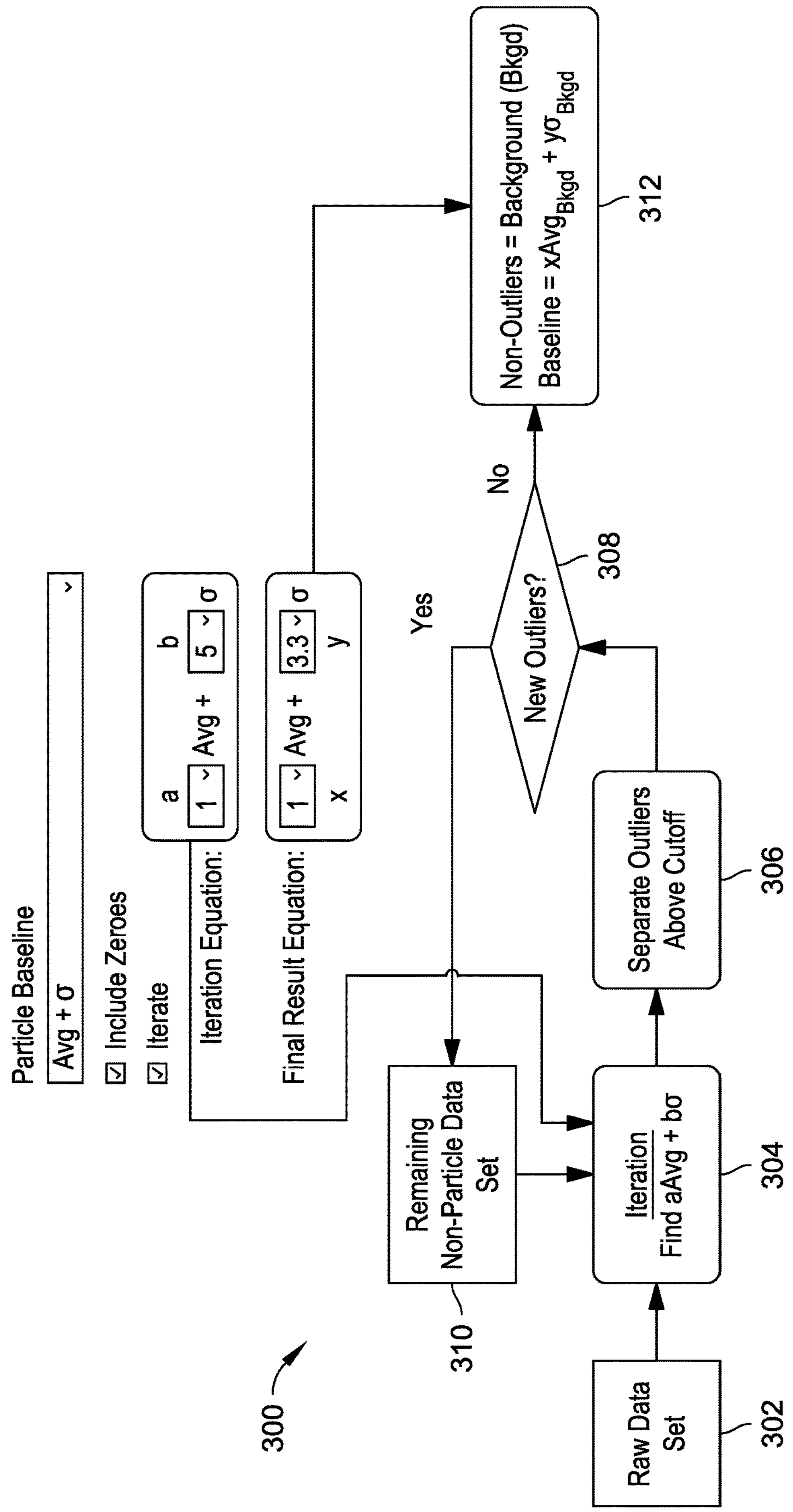
FIG. 4 is a flow diagram of the process of FIG. 3, showing an example iteration step.
Figure 5:
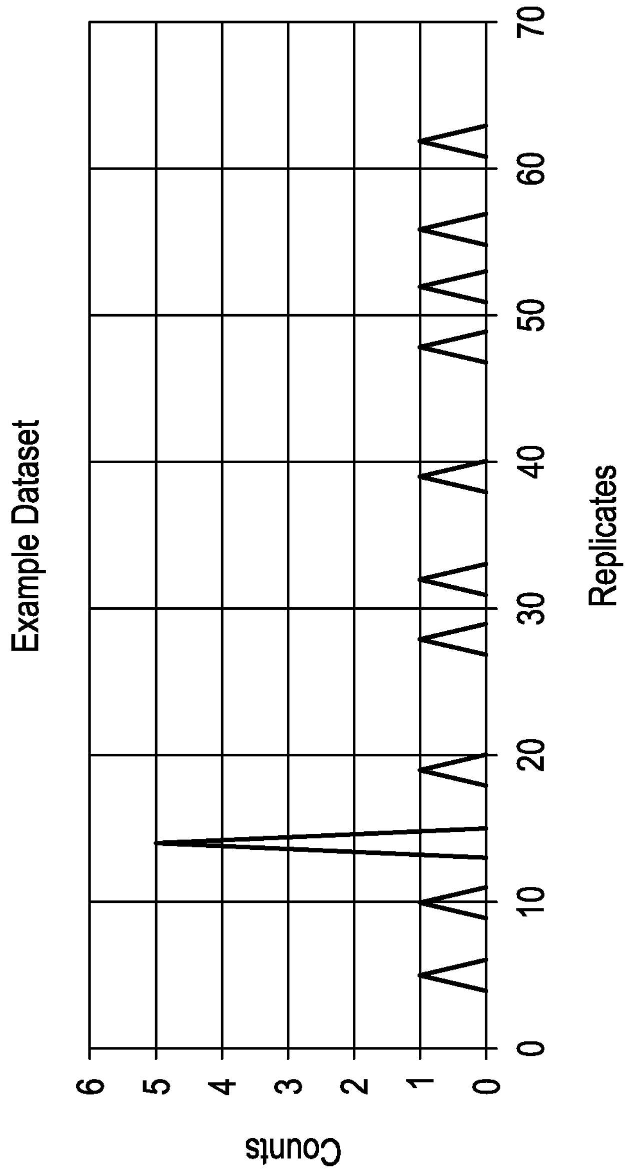
FIG. 5 is a schematic illustration of an example dataset of the iteration step of the process of FIG. 3.
Figure 6:
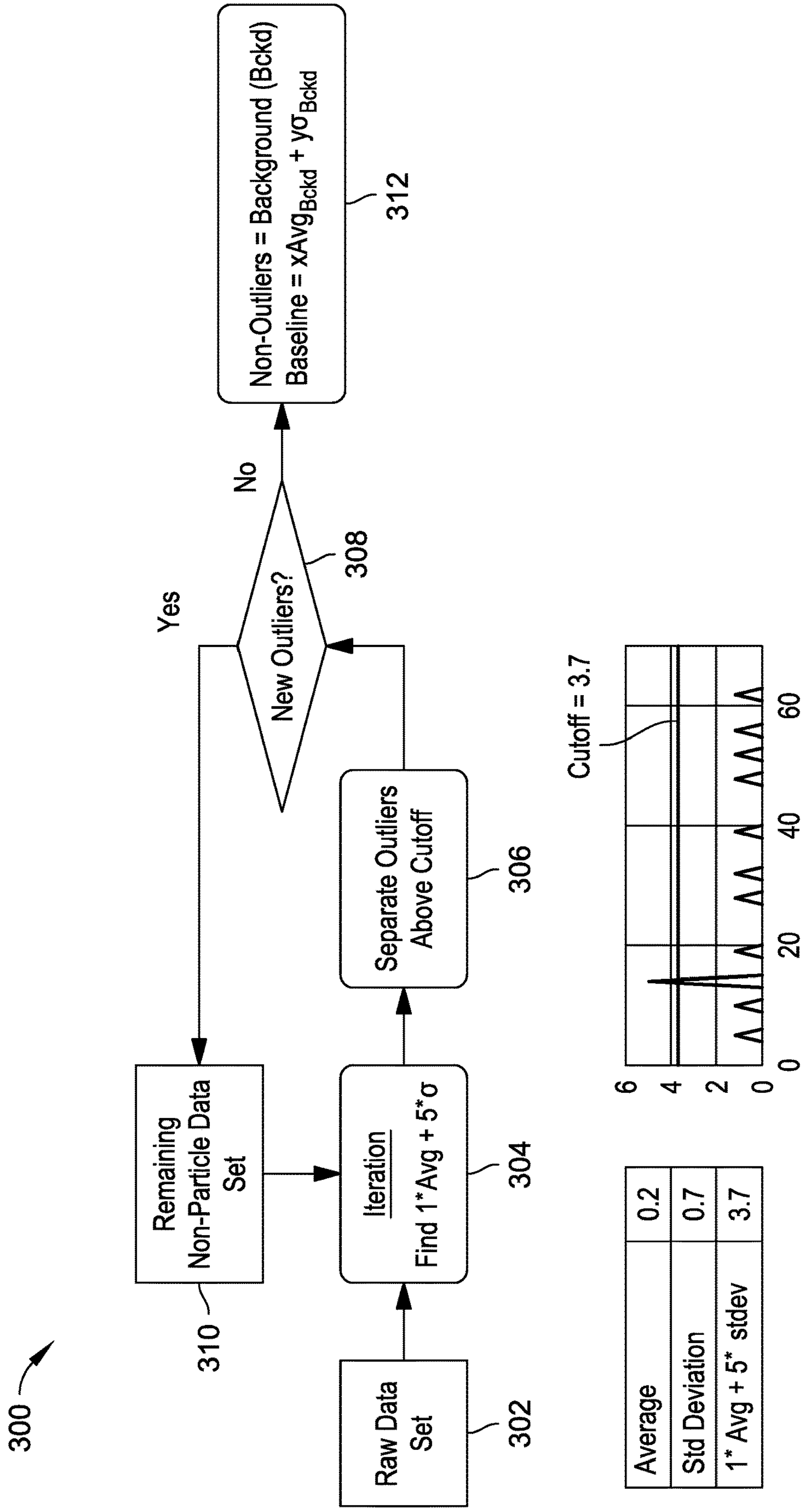
FIG. 6 is a schematic illustration of a first iteration of the process of FIG. 3 to remove a first portion of outlier data.
Figure 7:
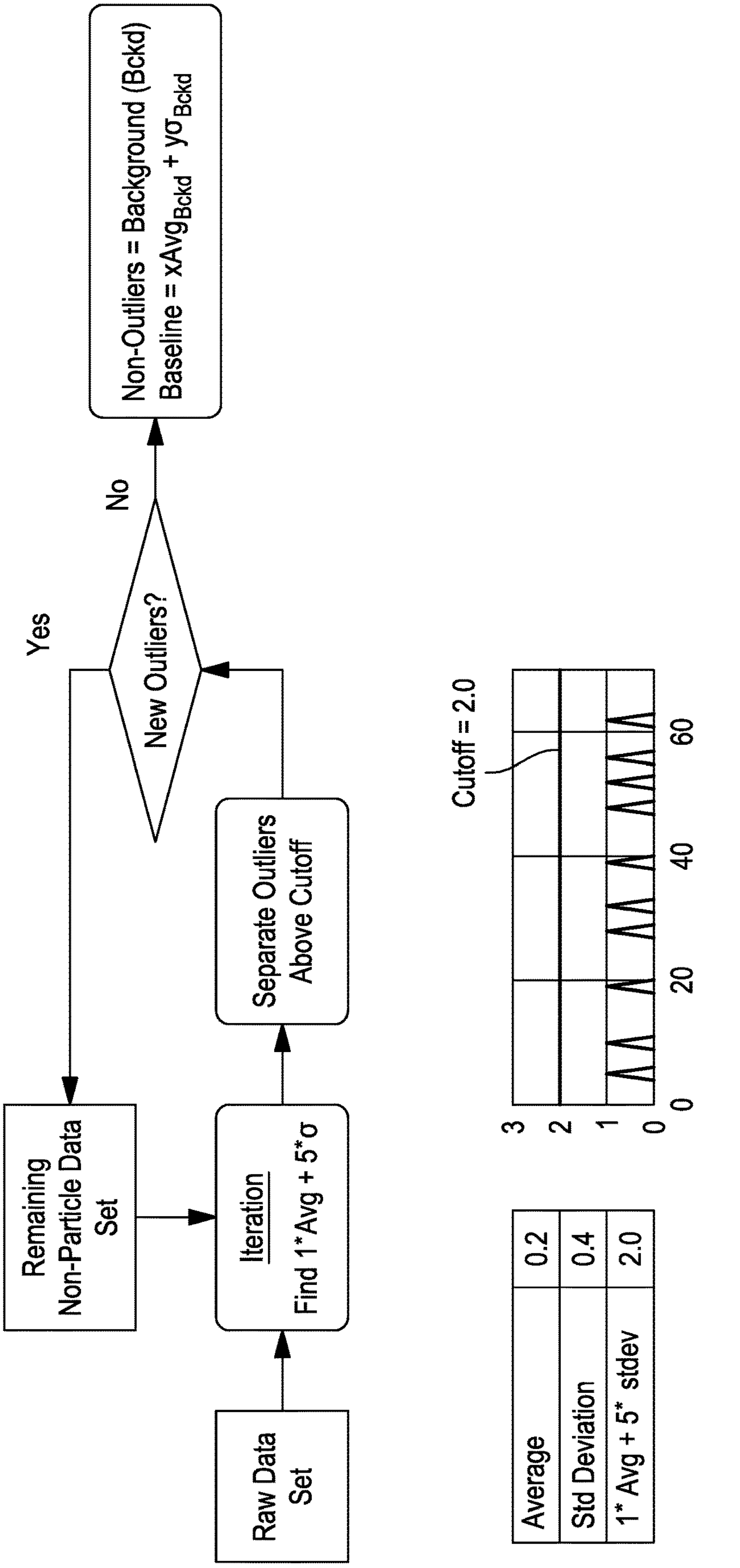
FIG. 7 is a schematic illustration of a second iteration of the process of FIG. 3 to determine whether any outlier data remains.

Referring to FIGS. 4-6, an initial iterative step for treatment of the raw data set is shown, where FIG. 5 shows an example raw dataset from block 302 provided in simplified form for initial outlier removal. As shown in FIG. 6, the outlier threshold is determined to be 3.7 based on a threshold calculation of $1\mu+5\sigma$. Data exceeding the 3.7 cutoff is identified as outliers and subsequently removed from the dataset for further iterations. For example, the replicates shown exceeding the threshold line of 3.7 (i.e., those extending near 5) are removed from the dataset in block 306. FIG. 7 shows a second iteration illustrating the dataset with the datapoints that exceeded the threshold line of 3.7 removed. In the second iteration, the new outlier threshold is determined to be 2.0 based on the same threshold calculation of $1\mu+5\sigma$, wherein no datapoints are determined to be outliers, since no datapoints exceed 2.0.

Figure 8:
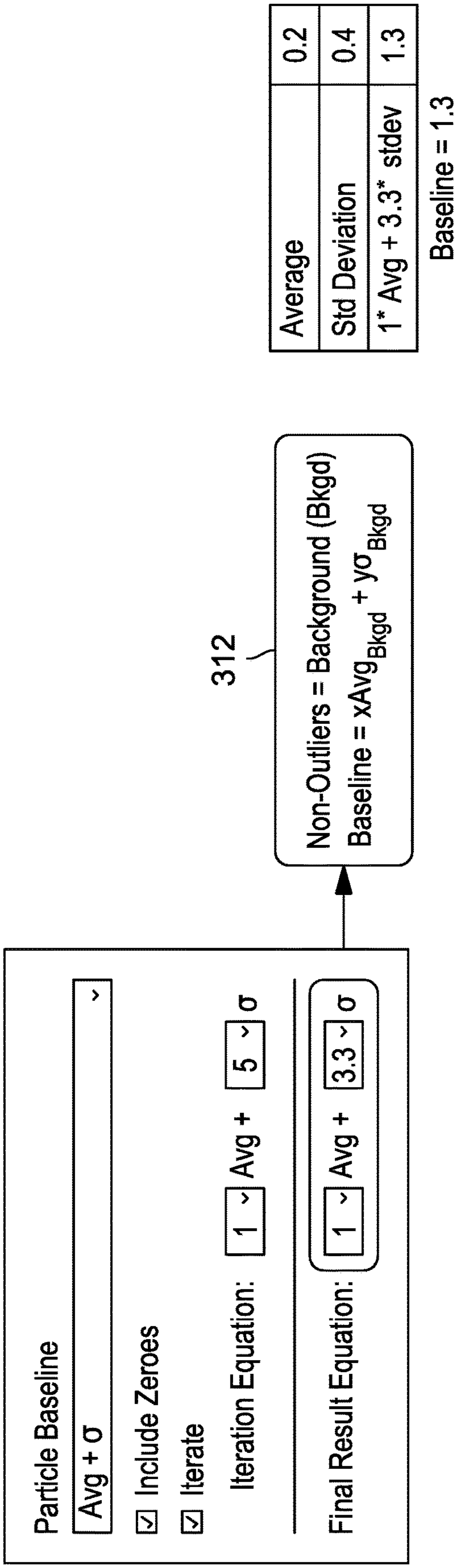
FIG. 8 is a schematic illustration of a particle baseline determination of the process of FIG. 3 following outlier removal.

When no outliers are present, the process 300 determines that the nanoparticle outliers have been removed from the dataset, such that a nanoparticle baseline determination can be made. The process 300 then moves to block 312 to determine the nanoparticle baseline based on the data background. For example, FIG. 8 shows the resultant data providing the data background and determines the nanoparticle baseline based on the data background. While the particle baseline formula shown includes $1*avg_{background}+3.3*standarddeviation_{background}$ the process is not limited to such values, where different multiples for the average and the standard deviation can be utilized. For example, in implementations, the multiples for the average and the standard deviation are a user-selectable feature. In implementations, the multiples for the average and the standard deviation can be different than the multiples for the average and the standard deviation during the iterative removal steps of process 300 (e.g., during block 304). For example, the multiples for the average and the standard deviation for the particle baseline calculation as 1 and 3.3, respectively, whereas the multiples for the average and the standard deviation for the iterative removal calculation as 1 and 5, respectively. Differing multiples for the standard deviation can provide different levels of strictness in determining what data is considered below or above the particle baseline following determination of the background datasets. In implementations, the process 300 can remove zero values for the datasets.

Figure 9A:
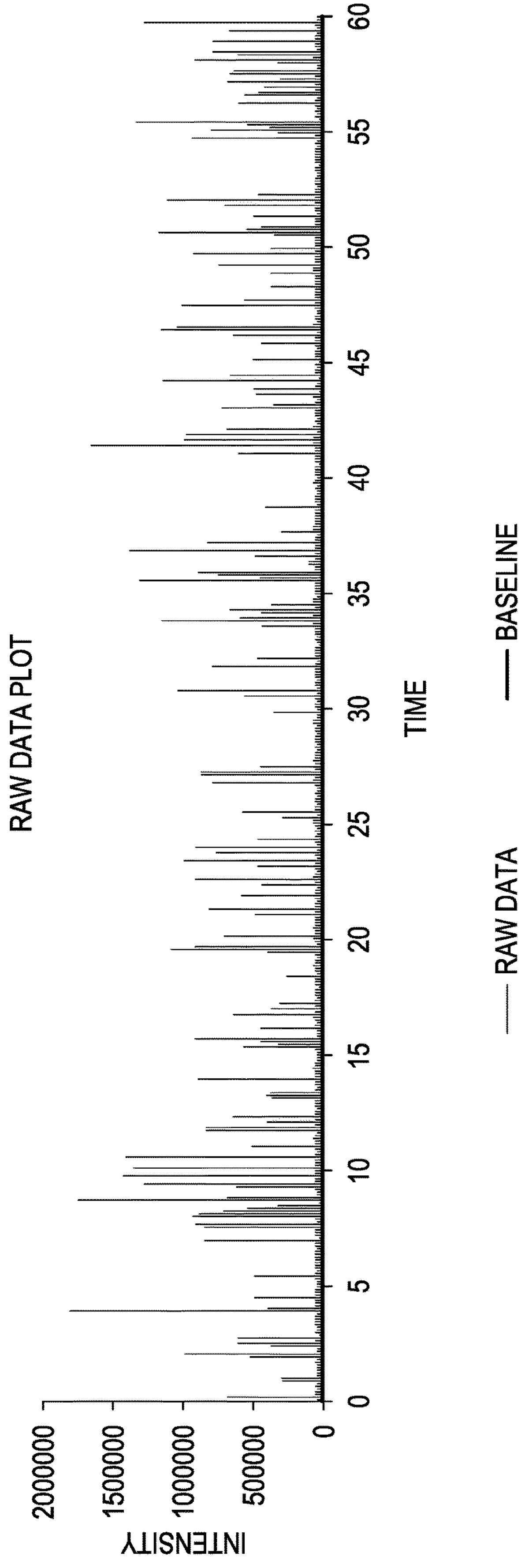
FIG. 9A is a diagram of example datasets analyzed in accordance with example implementations of the present disclosure.
Figure 9B:
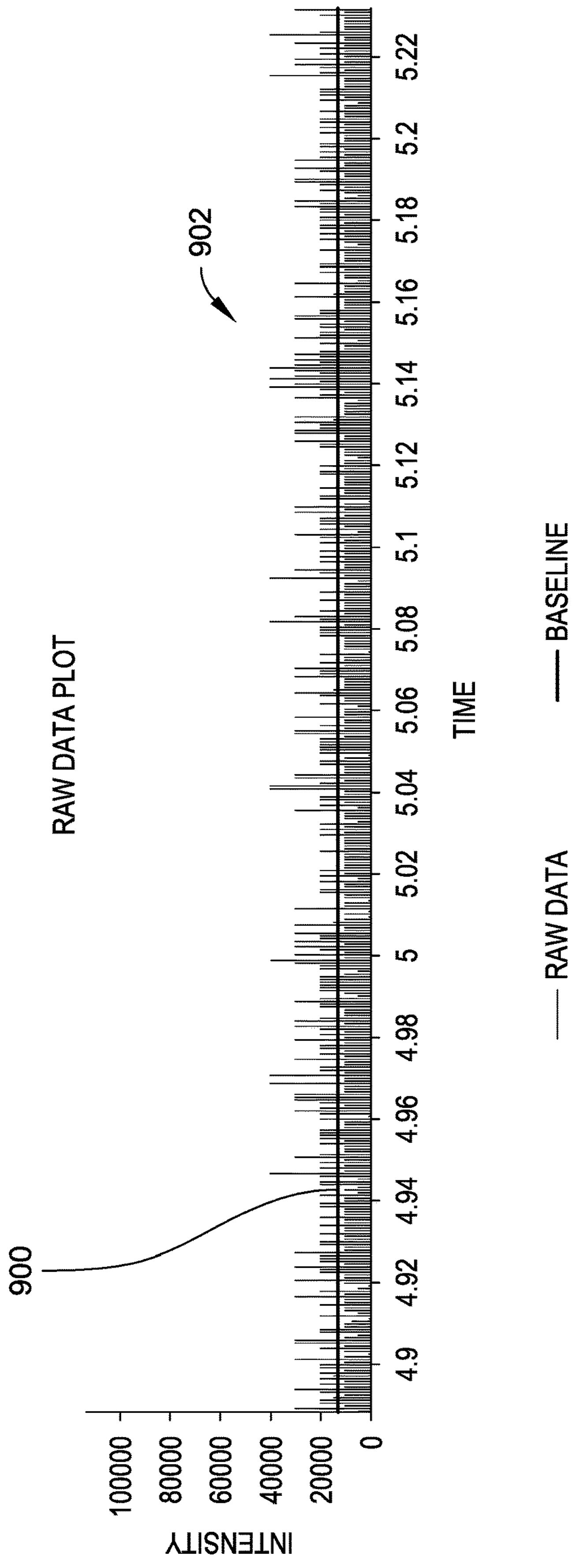
FIG. 9B is a diagram showing a close-up of the data from FIG. 9A with the determined particle baseline shown over the spectrometry data.

Referring to FIGS. 9A and 9B, example datasets are shown with the iterative step including a formula of 1*avg+5*standarddeviation and the particle baseline formula of $1*avg_{background}+1*standarddeviation_{background}$. FIG. 9B illustrates a subset of the data from FIG. 9A with the determined particle baseline 900 shown over the spectrometry data 902.

Figure 10:
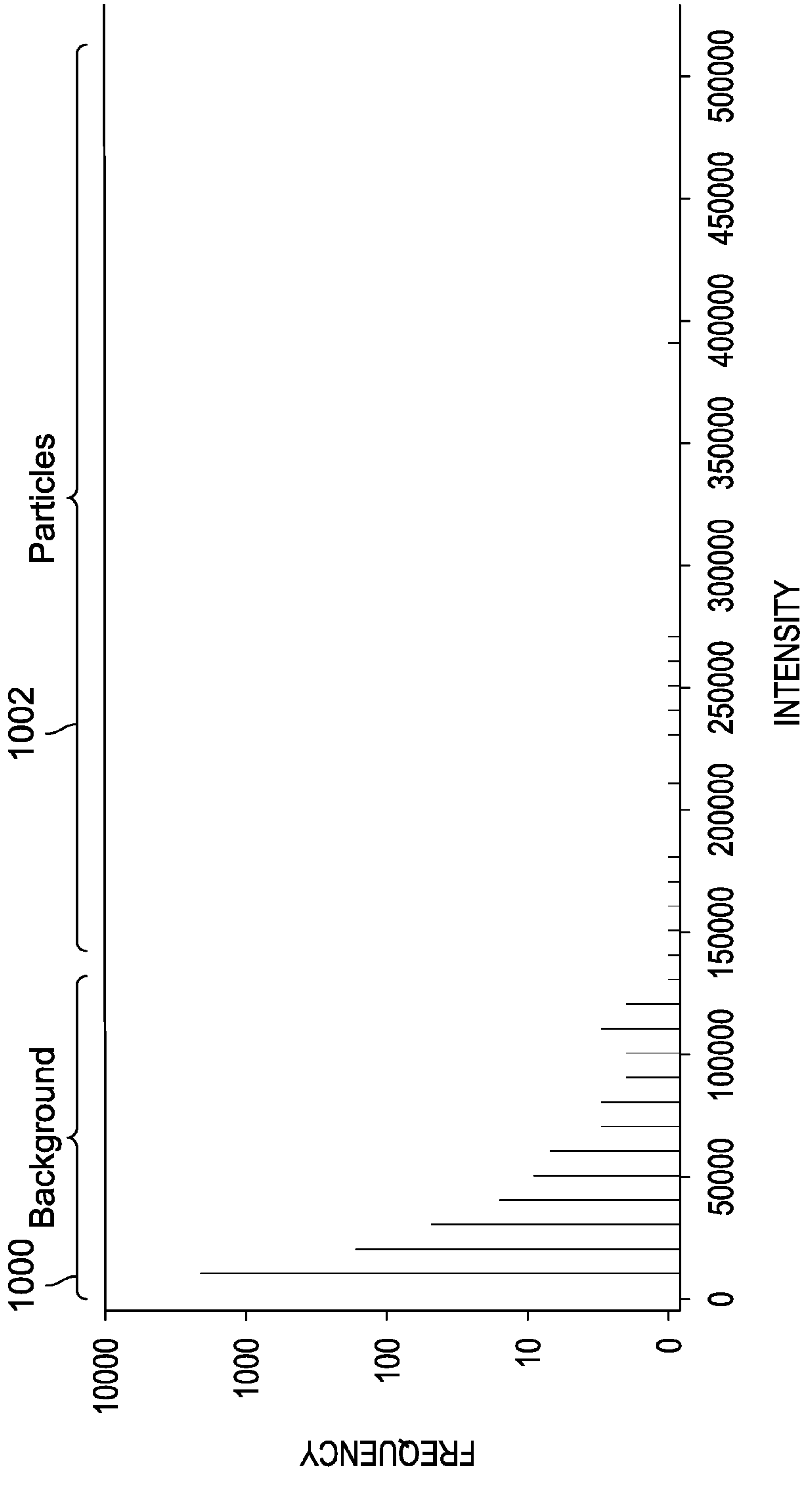
FIG. 10 is a schematic illustration of a spectrometry data set shown with an approximated background determination for determination of nanoparticles in accordance with example implementations of the present disclosure.

Referring to FIGS. 10 through 15, a local minimum data process is described for the determination of a detection threshold of nanoparticles. FIG. 10 shows an example spectrometry data set with an approximated background determination for the detection of nanoparticles where the portion of the data set attributable to signal background (shown as 1000, e.g., attributable to background interference, such as resulting from ionized plasma gases from the ICP torch) is separated from data set attributable to nanoparticles (shown as 1002). The nanoparticle detection threshold represents the transition from the background portion 1000 to the nanoparticle portion 1002, where the nanoparticle detection threshold provides a data boundary where data points involving intensities greater than the nanoparticle detection threshold can be treated as originating from nanoparticles present in the sample.

Figure 11:
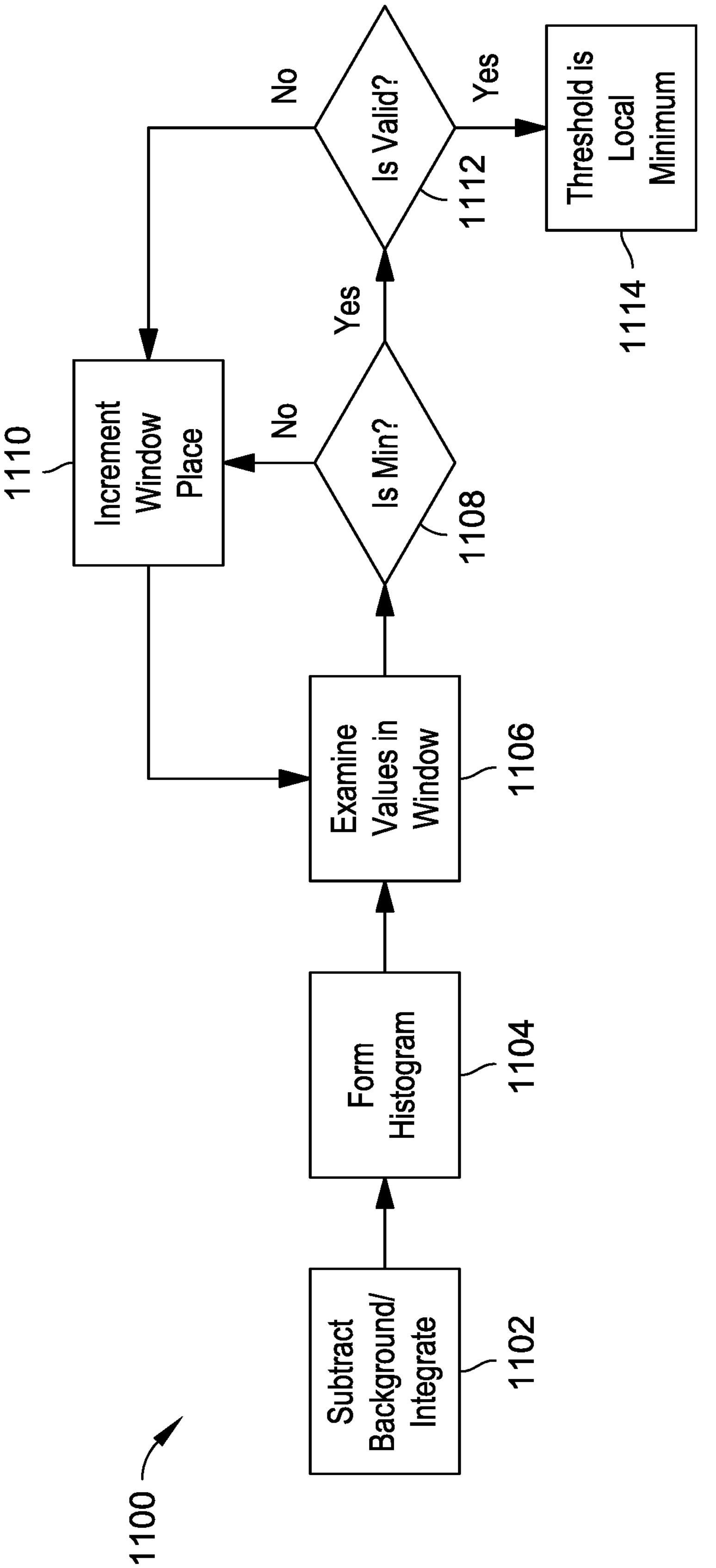
FIG. 11 is a flow diagram of a process for local minimum determination and validation from a spectrometry data set to determine a detection threshold for nanoparticles in accordance with example implementations of the present disclosure.

Referring to FIG. 11, a flow diagram is shown of a process 1100 for local minimum determination and validation of a spectrometry data set to determine a detection threshold for nanoparticles in accordance with example implementations of the present disclosure. The flow diagram begins with a raw data set being manipulated to remove background and to integrate contiguous data points in block 1102. In implementations, the raw data set includes an intensity over time data set provided by an ICPMS, where the background to be removed from the raw data set is determined through a data process, such as the iterative determination data process described with respect to FIGS. 2 through 9B, is a user-selected feature, or combinations thereof. In implementations, the data set is integrated following removal of the background from the raw data set. For example, time-consecutive non-zero data points for detected intensity are summed together, where the data points can be considered to be time-consecutive when no intervening zero value is detected by the ICPMS for a given time detection interval, such as a detection interval of 0.01 secs. By integrating after background removal, more zero data points can be present since the background removal can filter out lower non-zero data points from the raw data set to provide zero values.

The process 1100 then continues to block 1104 where a histogram of the manipulated data set is formed. In implementations, the histogram is formed by rounding all integrated data points to the nearest integer count value and determining the frequency for each rounded point (e.g., a value of 3.2 is rounded to a value of 3, whereas a value of 3.7 is rounded to 4). In implementations, the data is rounded down to the next integer count value (e.g., each of 3.2 and 3.7 is rounded down to a value of 3). In implementations, the data is rounded up to the next integer count value (e.g., each of 3.2 and 3.7 is rounded up to a value of 4). The histogram can be formed from the rounded points based on how many of each point is present (e.g., the frequency of occurrence of each count). Example histograms of simplified data sets are shown with respect to FIGS. 12A through 14.

The process 1100 further includes examining frequencies of the histogram based on a window size for the counts to determine potential local minimum count values in block 1106. In implementations, the window size is an odd number (e.g., a window covering five counts), where the center value for the window is compared against values to the left and to the right of the center position on the histogram to determine whether a local minimum count is present (e.g., whether the frequency of the count at the center of the window is less than the frequencies of the counts to the left and to the right of the center count based on the window size). For counts at the beginning edge of the histogram, (e.g., counts 0, 1, 2, etc.), the window may be contracted by not extending over the full window size. For example, FIG. 11A shows a window 1200 covering counts 1 through 4 (i.e., a window size of four), where a frequency of 26, count 2 is reviewed for determining whether the frequency of 26, count 2 is the potential minimum for the given window. The window could be considered as covering count 0 to the left of count 1, such that count 2 is positioned at the center of the window 1200 having a window size of five counts, however no data exists for count 0, so the window covers those counts that are present in the histogram. Similarly, prior to considering count 2, count 1 would be reviewed for a potential local minimum, where if count 1 was the center position of the window 1200, the frequency of 51 would be compared against the frequency of 26, count 2 and the frequency of 12, count 3 to determine whether 51 is the local minimum, where it would be determined that it is not a local minimum.

Figure 12A:
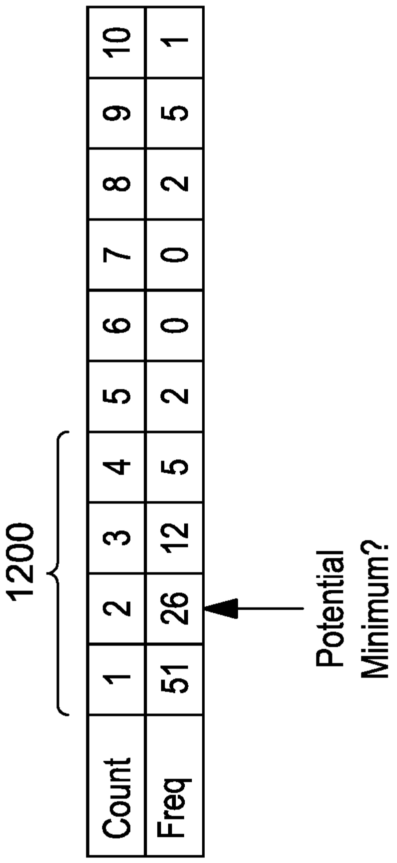
FIG. 12A is a schematic illustration of an example window used to determine potential minimum data points from a histogram of the spectrometry data.

The process 1100 determines whether the center frequency value of the window is a local minimum in block 1108. If the center frequency value is not a local minimum, the process 1100 proceeds to block 1110 where the window is incremented further to the right of the histogram to review additional count ranges to determine whether the new center frequency value is a local minimum (e.g., via blocks 1106 and 1108). For example, the frequency of 26, count 2 from FIG. 12A is not a local minimum, since the frequency of 12, count 3 and the frequency of 5, count 4 are each less than 26. The window 1200 would then be moved to be centered above count 3 to evaluate whether the frequency of 12 is a local minimum as compared against the frequencies of count 1, count 2, count 4, and count 5. The frequency of 12, count 3 would not be the local minimum, since the frequency of 5, count 4 and the frequency of 2, count 5 are each less than 12. The window 1200 would then be moved to be centered above count 4 to evaluate whether the frequency of 5 is a local minimum as compared against the frequencies of count 2, count 3, count 5, and count 6.

Figure 12B:
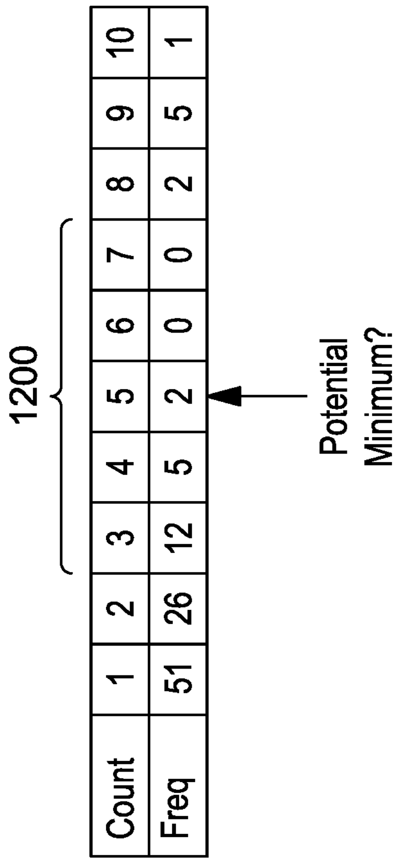
FIG. 12B is a schematic illustration of an example window used to determine potential minimum data points from a histogram of the spectrometry data.
Figure 13:
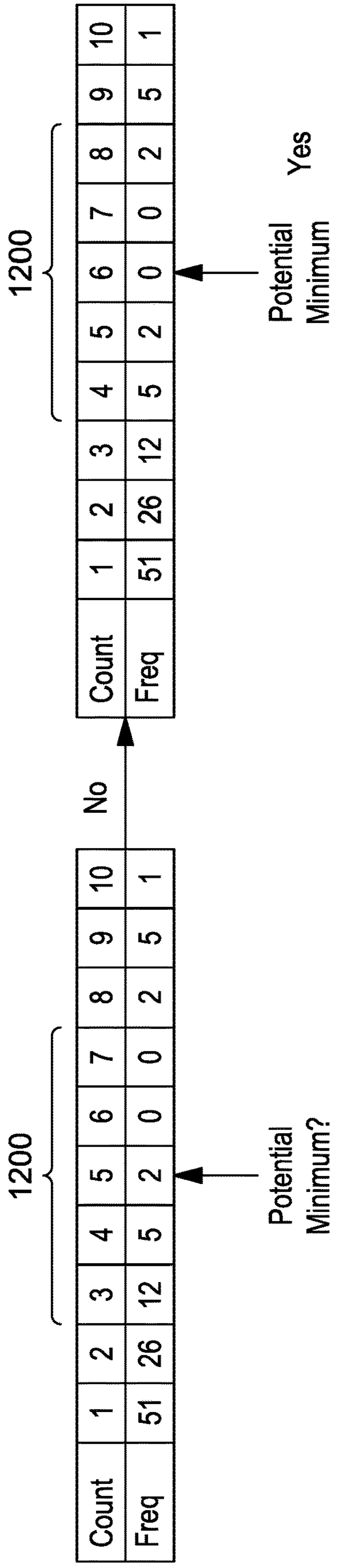
FIG. 13 is a schematic illustration of determining whether data points from a histogram of the spectrometry data are potential local minimum data points for an example window size.

The process 1100 would continue to evaluate each new iteration of the placement of the window 1200. For example, FIGS. 12B and 13 show the window 1200 further down the histogram as compared to FIG. 12A, where the window 1200 covers counts 3 through 7 (i.e., a window value of 5), to determine whether a frequency of 2 would be a potential minimum for the given window. Since the window placement includes 0 frequency values at counts 6 and 7 within the window 1200, the process 1100 would not identify a frequency of 2 as a potential minimum. The process 1100 would continue until a potential local minimum is identified. For example FIG. 13 shows the window incrementing to the right of the histogram until centered above frequency 0, count 6 which is identified as the potential minimum.

When a potential minimum is identified in block 1108, the process 1100 continues to block 1112, where the process 1100 validates whether the potential minimum is a validated minimum. If the potential minimum is not validated, process 1100 continues back to block 1110 to increment the window to be centered above the next count. If the potential minimum is validated in block 1112, the process 1100 would identify the local minimum as a threshold value for nanoparticle detection in block 1114. For example, referring to FIG. 14, the frequency value of 2 in the histogram is first identified as a potential minimum, since 2 is less than the frequency value of the remainder of the values in the window 1200 (i.e., 2 is less than 22, 18, and 15).

The process 1100 then determines whether that potential minimum is validated. In implementations, to determine if a local minimum is valid, the average value of all the frequencies within the window is calculated to determine whether the potential minimum is within one standard deviation from the window average. In implementations, the validation can include determining whether the potential minimum is within a multiple of the standard deviation from the window average. If the potential minimum is more than one standard deviation from the window average, then the potential minimum is not validated as a minimum value. For example, referring to FIG. 14, the frequency value of 2, count 2 is not validated, since the frequency value of 2 is not within one standard deviation (shown as 8.65) of the window average (14.25). For instance, 2+8.65 is less than 14.25, so the frequency value of 2, count 2 is not validated.

Figure 14:
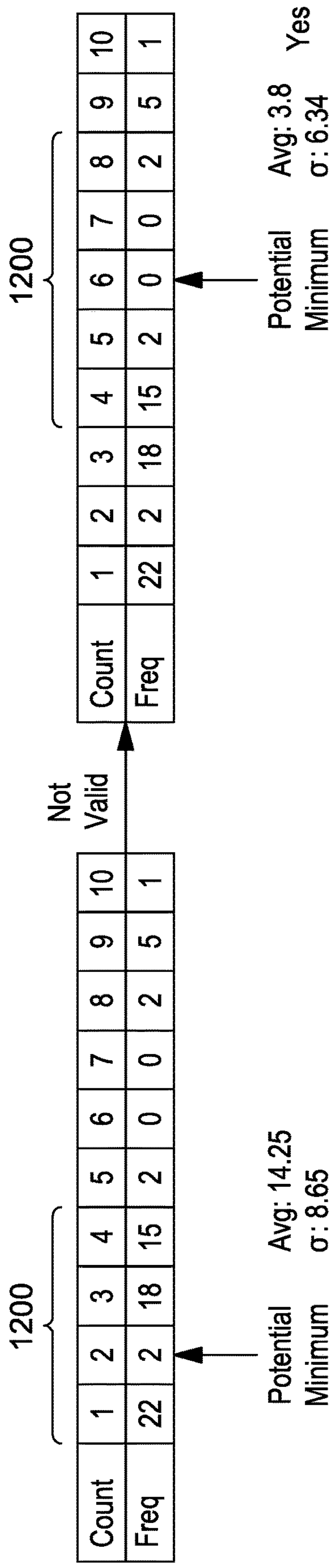
FIG. 14 is a schematic illustration of validating potential local minimum data points from a histogram of the spectrometry data are potential local minimum data points for an example window size.
Figure 15:
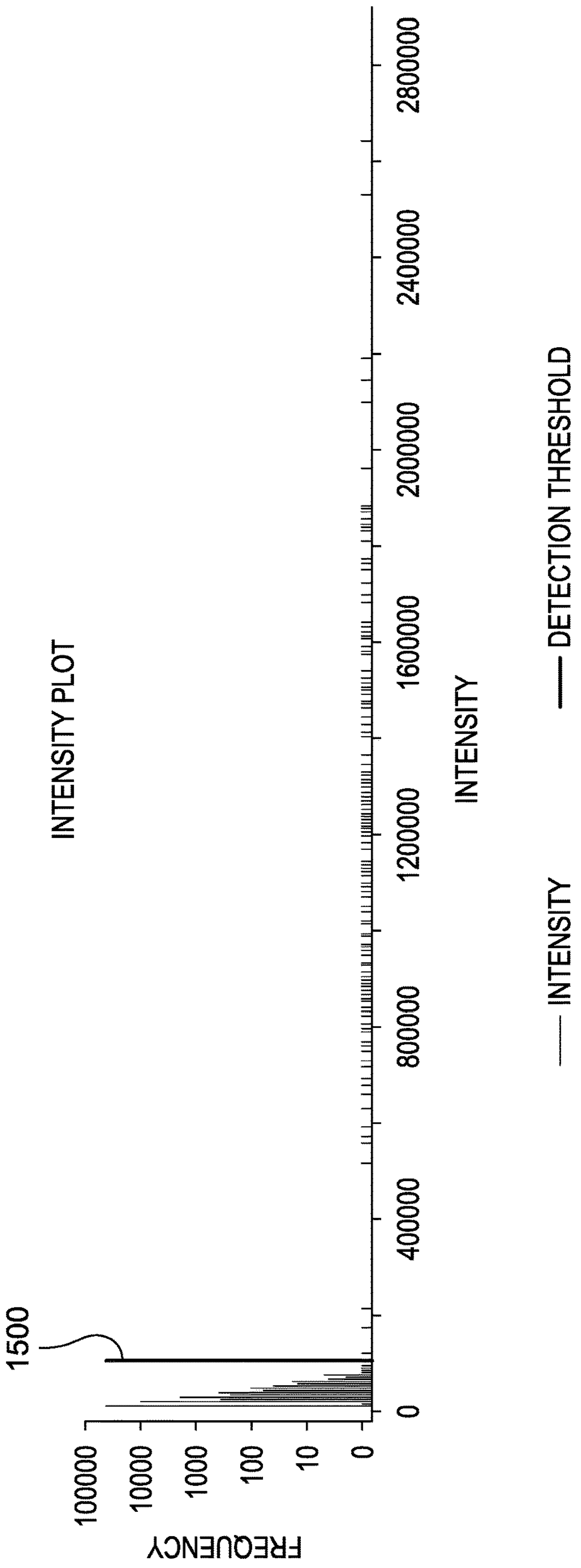
FIG. 15 is a diagram of example datasets analyzed in accordance with example implementations of the present disclosure, with a detection threshold for nanoparticles shown.
Figure 16:
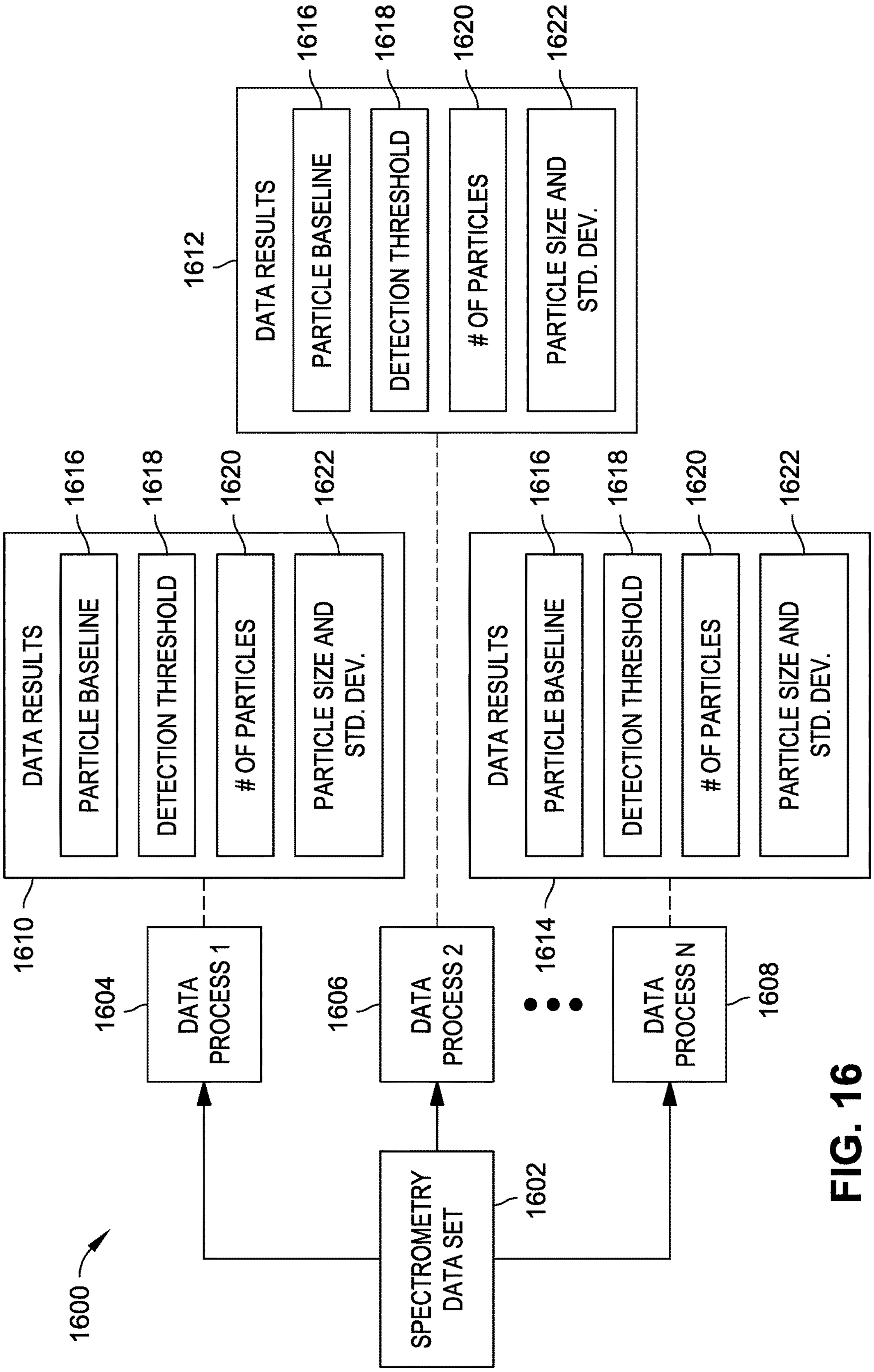
FIG. 16 is a schematic illustration of a method for multi data process switching in accordance with example implementations of the present disclosure.
Figure 17:
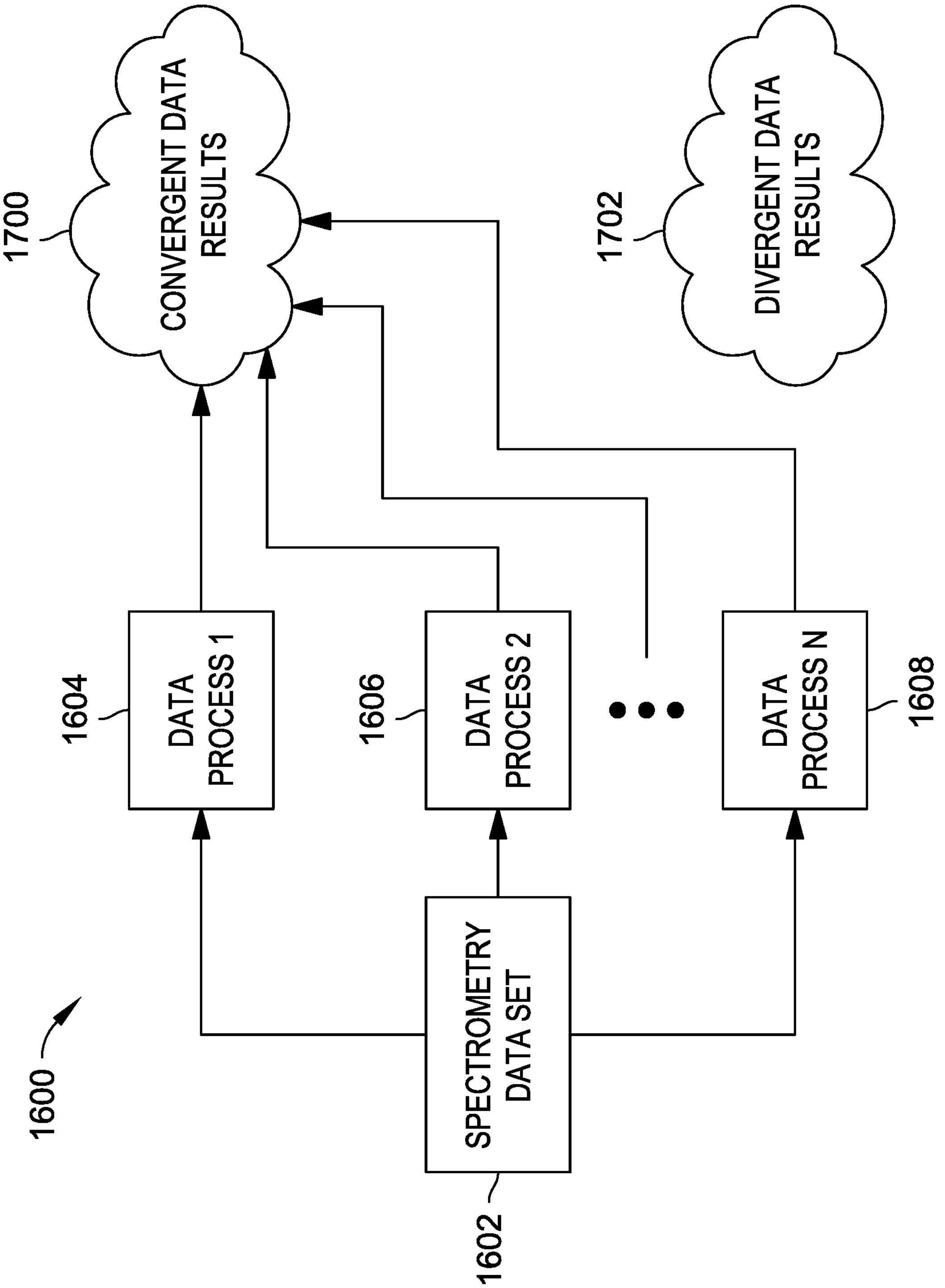
FIG. 17 is a schematic illustration of the method of FIG. 16 with multiple data processes having convergent data results.

Continuing with the example shown in FIG. 14, the window place is incremented down the histogram until centered above count 6, where the frequency of 0 is determined to be a potential minimum. The frequency of 0 is within one standard deviation (6.34) of the window average (3.8), thereby validating count 6, frequency 0 to be the local minimum. The validated localized minimum in then used as the detection threshold for nanoparticles, where intensities greater than the detection threshold are treated as nanoparticles and intensities lower than the detection threshold are treated as background (e.g., ionic samples, mass spectrometry interference, nanoparticles of a size below the detection threshold). FIG. 15 shows an example dataset analyzed according to the local minimum analysis process, with a detection threshold 1500 illustrated to separate background (i.e., intensity values preceding the detection threshold 1500) from intensity values corresponding to nanoparticles present in the sample (i.e., intensity values following the detection threshold 1500).

Referring to FIGS. 16 through 19, a process 1600 is shown for utilizing multiple data processes for the determination of nanoparticle baseline and nanoparticle detection thresholds in accordance with example implementations of the present disclosure. The system 100 can utilize the process 1600 to analyze a single data set from the sample analyzer 106 according to multiple data processes to compare the results against each other (e.g., via the controller 108), such as to determine converging or diverging data results from the multiple data processes. The process 1600 can include analyzing a spectrometry data set 1602 with multiple data processes (e.g., data processes 1604, 1606, 1608) to achieve multiple data results, where the multiple data processes are automatically switched from one data process to the next data process to analyze the same spectrometry data set according to the multiple data processes. For instance, the controller 108 can automate analysis of the spectrometry data set 1602 according to one data process, then switch to analyze the initial spectrometry data set 1602 according to one or more different analyses to determine whether the results of the data processes are reliable or too divergent. For example, the process 1600 is shown with a first data process 1604, a second data process 1606, up to n data processes 1608 used to process the same spectrometry data set (e.g., spectrometry data set 1602) to provide an indication of reliability of the results of one or more of the data processes, where n can be any number greater than 2. In implementations, the controller 108 of the system 100 facilitates analysis of the spectrometry data set 1602 according to one or more of the data processes of process 1600. For example, the controller 108 can include or be communicatively coupled with a computer memory device that stores one or more data algorithms, programs, or other processes to generate data results according to one or more of the data processes of process 1600.

The data processes (e.g., data processes 1604, 1606, 1608) can include, but are not limited to, the iterative determination data process described with respect to FIGS. 2 through 9B, the local minimum data process described with respect to FIGS. 10 through 15, an instrument specific data analysis process (e.g., ICPMS analysis instrument software), a user defined data process having user-configurable features and/or user-defined values (e.g., facilitating a user to select a reference material, determine what particle baseline and detection threshold are to be used for the reference material, and apply the particle baseline and detection threshold for future samples), or other data processes. Each of the data processes produces a data result following processing of the original spectrometry data set. For example, the first data process 1604 is shown producing a first set of data results 1610, the second data process 1606 is shown producing a second set of data results 1612, and the third data process 1608 is shown producing a third set of data results 1614. Example data results include, but are not limited to, a particle baseline 1616, a nanoparticle detection threshold 1618, a number of particles 1620, a particle size and standard deviation 1622, and the like, and combinations thereof.

In implementations, each data process can provide one or more categories of data results, which can be the same categories or different categories than the other data processes used to analyze the spectrometry data set. For example, a first data process (e.g., data process 1604) can provide data results associated with a particle baseline and a detection threshold, a second data process (e.g., data process 1606) can provide data results associated with a detection threshold (and not a particle baseline), a third data process (e.g., a data process between data process 1606 and data process 1608) can provide data results associated with a particle baseline, a detection threshold, and a number of particles, and a fourth data process (e.g., data process 1608) can provide data results associated with a particle baseline, a detection threshold, a number of particles, and a particle size and standard deviation. The data results can help establish information associated with mass spectrometer interference, ionic material measurements, particles below the detection threshold, and so forth.

Figure 18:
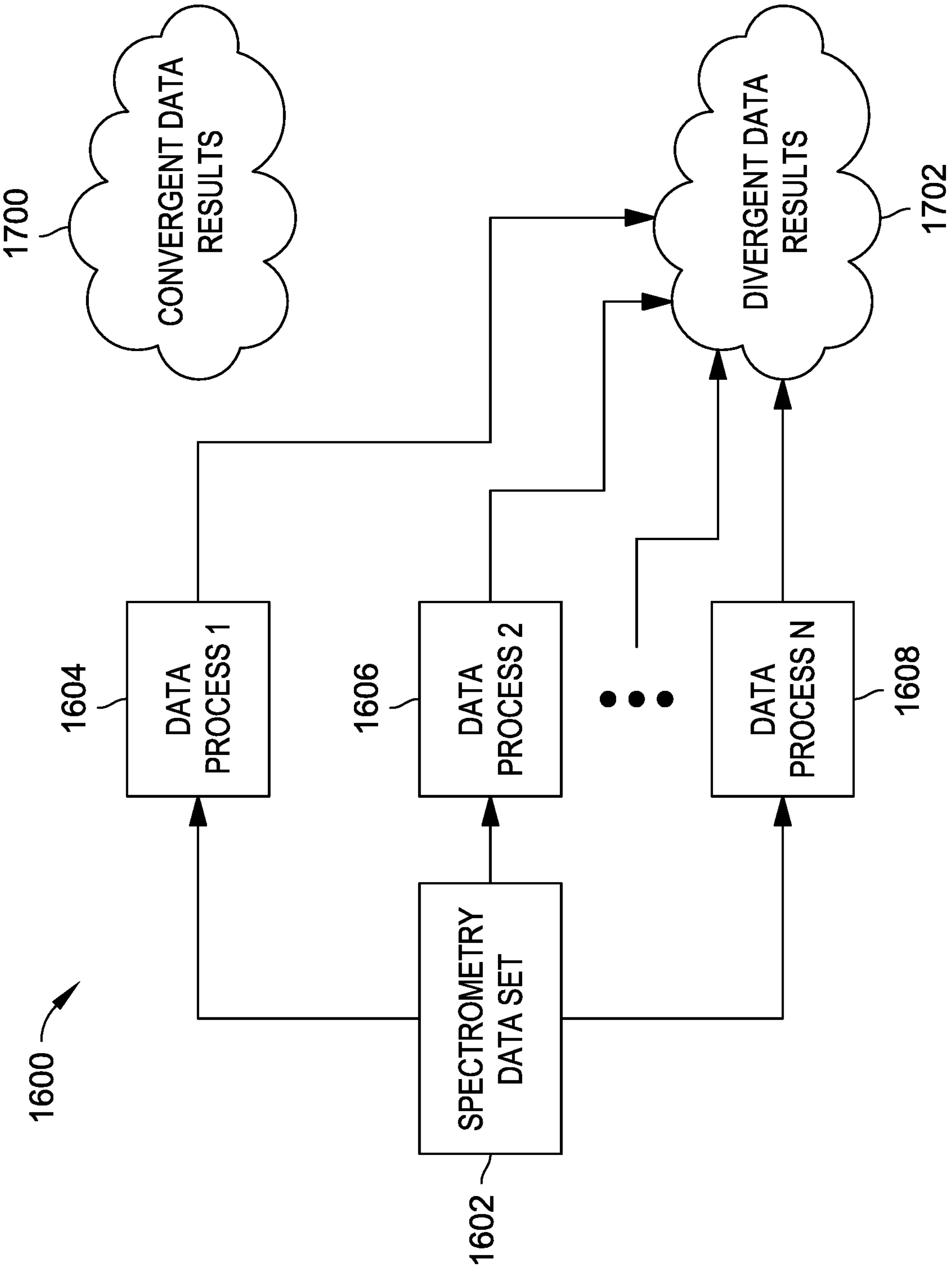
FIG. 18 is a schematic illustration of the method of FIG. 16 with multiple data processes having divergent data results.

The multiple data processes can be utilized to determine a probability that the data result from any one or more of the data processes is a reliable result or an unreliable result. For example, referring to FIG. 17, each of the data processes is shown providing convergent data results (e.g., shown as 1700) which provides a high confidence level that the results of each of the data processes is reliable. Determining whether the results of the data processes are convergent or divergent (e.g., shown as 1702) can occur through statistical models, such as determining whether a data process result is excluded from a standard deviation analysis of the total results, or through another model. For example, each of the data processes can output data results associated with a nanoparticle detection threshold, where the detection threshold of each data process is within a statistical similarity to indicate a high probability of a reliable nanoparticle detection threshold. Referring to FIG. 18, each of the data processes is shown providing divergent data results 1702, which provides a high confidence level that the results of the data processes cannot be certified or are otherwise unreliable (e.g., an erroneous sample analysis).

Figure 19:
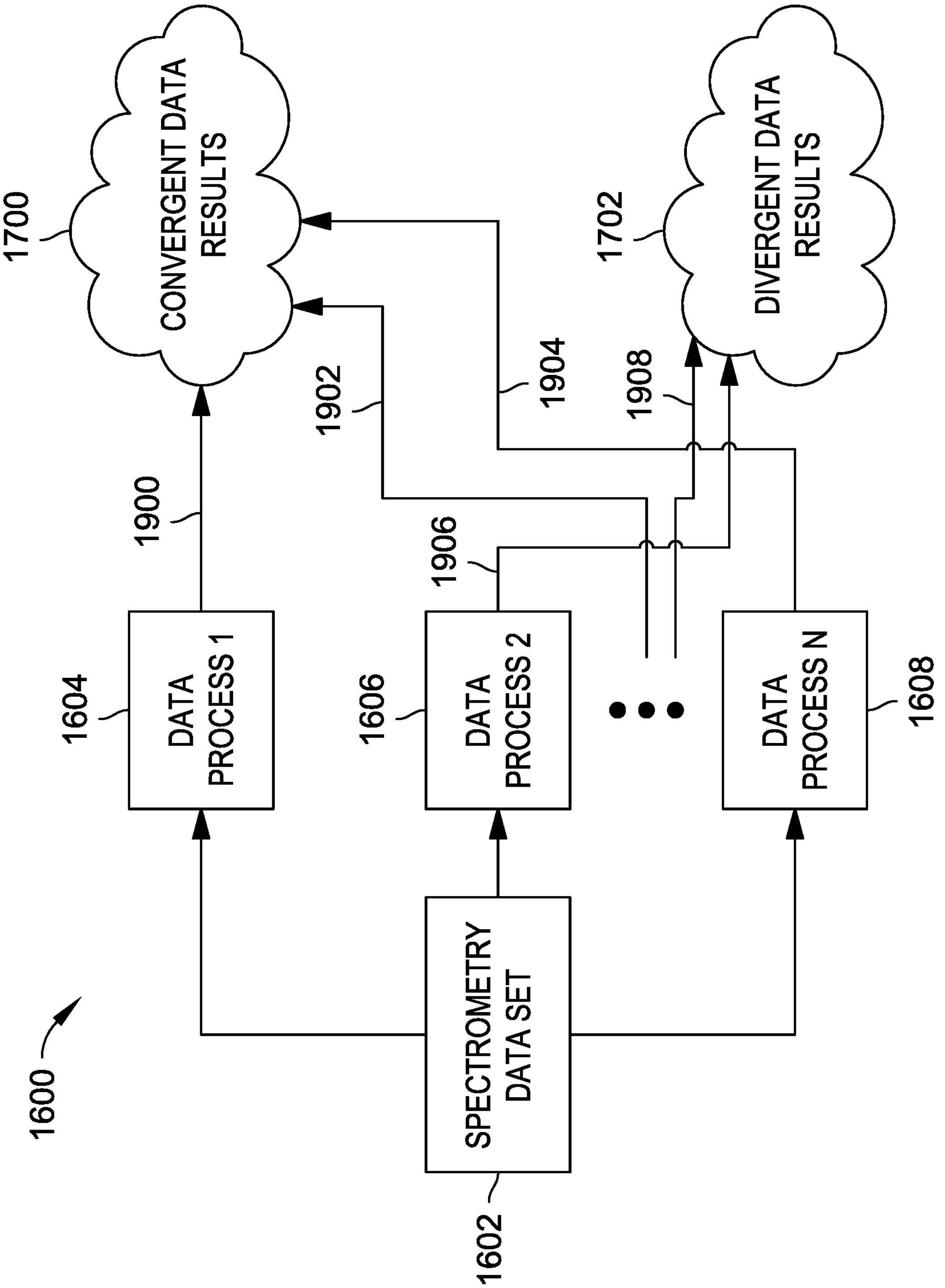
FIG. 19 is a schematic illustration of the method of FIG. 16 with multiple data processes having convergent data results and multiple data processes having divergent data results.

Referring to FIG. 19, the data results from the multiple data processes are shown as being mixed between convergent 1700 and divergent data results 1702. For instance, three data results are shown as convergent data results (e.g., data results 1900, 1902, 1904) and two data results are shown as divergent data results (e.g., data results 1906, 1908). When results are mixed, such that convergent and divergent data results are provided from the multiple data processes, statistical models can be utilized to determine whether there are enough convergent results to discard or otherwise disregard the divergent results or whether there are too many divergent results such that there is a low reliability for the data processes, such as determining whether a data process result is excluded from a standard deviation analysis of the total results, or through another model. For example, a simple majority of converging results can indicate a satisfactory reliability of the converging data results. In implementations, if a threshold number of divergent data results are present, the overall data results can be flagged as unreliable by the system 100. For instance, the system 100 can be configured such that if two different data processes are divergent from the remainder of the convergent data processes, then the controller 108 can identify all of the overall data results as unreliable. Alternatively or additionally, one or more data processes can be used as a benchmark data result and results from one or more additional data processes are compared against the benchmark data result to determine the scope of deviation from the benchmark.

The process can include reporting the results of the multiple data processes on an automatic basis. For example, the process can automatically identify and report out which data process(es) provided data results that were reliable (e.g., converged with other data results) or unreliable (e.g., diverged from other data results). In implementations, the controller 108 of the system 100 generates one or more communication signals responsive to generation of data results from one or more of the data processes. For example, the one or more communication signals can be sent to a user interface for review by laboratory personnel.

Electromechanical devices (e.g., electrical motors, servos, actuators, or the like) may be coupled with or embedded within the components of the system 100 to facilitate automated operation via control logic embedded within or externally driving the system 100. The electromechanical devices can be configured to cause movement of devices and fluids according to various procedures, such as the procedures described herein. The system 100 may include or be controlled by a computing system having a processor or other controller configured to execute computer readable program instructions (i.e., the control logic) from a non-transitory carrier medium (e.g., storage medium such as a flash drive, hard disk drive, solid-state disk drive, SD card, optical disk, or the like). The computing system can be connected to various components of the system 100, either by direct connection, or through one or more network connections (e.g., local area networking (LAN), wireless area networking (WAN or WLAN), one or more hub connections (e.g., USB hubs), and so forth). For example, the computing system can be communicatively coupled to the system controller, ICP torch, carriage motors, fluid handling systems (e.g., valves, pumps, etc.), other components described herein, components directing control thereof, or combinations thereof. The program instructions, when executed by the processor or other controller, can cause the computing system to control the system 100 according to one or more modes of operation, as described herein.

It should be recognized that the various functions, control operations, processing blocks, or steps described throughout the present disclosure may be carried out by any combination of hardware, software, or firmware. In some embodiments, various steps or functions are carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, a mobile computing device, mainframe computing system, workstation, image computer, parallel processor, or any other device known in the art. In general, the term "computing system" is broadly defined to encompass any device having one or more processors or other controllers, which execute instructions from a carrier medium.

Program instructions implementing functions, control operations, processing blocks, or steps, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method for determination of nanoparticle detection threshold of a fluid sample, comprising:

transferring a fluid sample containing nanoparticles to a spectrometry sample analyzer;

generating a spectrometry data set via the spectrometry sample analyzer associated with detected ion signal intensity over time;

subtracting from the spectrometry data set, via one or more computer processors, a background intensity value to provide a subtracted spectrometry data set;

forming, via the one or more computer processors, a histogram of the subtracted spectrometry data set including a frequency of counts of integrated ion signal intensity values by summing time-consecutive non-zero data points for detected intensity;

incrementing along the histogram, via the one or more computer processors, a window spanning multiple counts of the histogram to determine a potential local minimum frequency value within the window;

validating, via the one or more computer processors, whether the potential local minimum frequency value is a local minimum for the histogram to provide a validated local minimum; and assigning, via the one or more computer processors, the validated local minimum as a detection threshold for nanoparticles in the spectrometry data set; and providing a nanoparticle spectrometry data set by removing from the spectrometry data set or the subtracted spectrometry data set, via the one or more computer processors, data points involving detected ion signal intensity values that are less than the nanoparticle detection threshold.

2. The method of claim 1, wherein the spectrometry sample analyzer is an inductively coupled plasma mass spectrometer (ICPMS).

3. The method of claim 2, wherein transferring a fluid sample containing nanoparticles to a spectrometry sample analyzer includes transferring the fluid sample from a fluid source to an inductively coupled plasma torch and subsequently to the ICPMS.

4. The method of claim 3, wherein transferring the fluid sample from a fluid source to an inductively coupled plasma torch includes transferring the fluid sample from the fluid source via autosampler control of a sample probe to the inductively coupled plasma torch.

5. The method of claim 1, further comprising rounding the summation of the time-consecutive non-zero data points for detected intensity following subtraction of the background intensity value.

6. The method of claim 5, wherein the summation of the time-consecutive non-zero data points for detected intensity following subtraction of the background intensity value is rounded down to the next integer count value.

7. The method of claim 5, wherein the summation of the time-consecutive non-zero data points for detected intensity following subtraction of the background intensity value is rounded up to the next integer count value.

8. The method of claim 1, wherein validating, via the one or more computer processors, whether the potential local minimum frequency value is a local minimum for the histogram to provide a validated local minimum includes determining whether the potential local minimum frequency value is within one standard deviation of an average value of the frequency values within the window.

9. The method of claim 1, wherein incrementing along the histogram, via the one or more computer processors, a window spanning multiple counts of the histogram to determine a potential local minimum frequency value within the window includes determining whether a frequency at a count in a center position of the window is less than respective other counts in the window.

10. A system for determination of nanoparticle detection threshold of a fluid sample, comprising:

- a spectrometry sample analyzer configured to receive a fluid sample containing nanoparticles from a sample source and to generate a spectrometry data set associated with detected ion signal intensity over time;
- one or more computer processors; and
- a non-transitory computer readable-medium bearing one or more instructions for execution by the one or more computer processors to cause the one or more computer processors to perform the steps of:
  - subtracting from the spectrometry data set a background intensity value to provide a subtracted spectrometry data set;
  - forming a histogram of the subtracted spectrometry data set including a frequency of counts of integrated ion signal intensity values by summing time-consecutive non-zero data points for detected intensity;
  - incrementing along the histogram a window spanning multiple counts of the histogram to determine a potential local minimum frequency value within the window;
  - validating whether the potential local minimum frequency value is a local minimum for the histogram to provide a validated local minimum;
  - assigning the validated local minimum as a detection threshold for nanoparticles in the spectrometry data set; and
  - providing a nanoparticle spectrometry data set by removing from the spectrometry data set or the subtracted spectrometry data set data points involving detected ion signal intensity values that are less than the nanoparticle detection threshold.

11. The system of claim 10, wherein the spectrometry sample analyzer is an inductively coupled plasma mass spectrometer (ICPMS).

12. The system of claim 11, further comprising an inductively coupled plasma torch fluidically coupled between the sample source and the ICPMS.

13. The system of claim 12, further comprising an autosampler directing control of a sample probe to introduce the fluid sample to the inductively coupled plasma torch.

14. The system of claim 10, wherein the one or more instructions further include one or more instructions for execution by the one or more computer processors to cause the one or more computer processors to perform the steps of rounding the summation of the time-consecutive non-zero data points for detected intensity following subtraction of the background intensity value.

15. The system of claim 10, wherein validating whether the potential local minimum frequency value is a local minimum for the histogram to provide a validated local minimum includes determining whether the potential local minimum frequency value is within one standard deviation of an average value of the frequency values within the window.

16. The system of claim 10, wherein incrementing along the histogram a window spanning multiple counts of the histogram to determine a potential local minimum frequency value within the window includes determining whether a frequency at a count in a center position of the window is less than respective other counts in the window.

* * * * *